(12) United States Patent
Seo et al.

(10) Patent No.: US 10,402,070 B2
(45) Date of Patent: Sep. 3, 2019

(54) MOBILE TERMINAL AND METHOD FOR EXECUTING A CONTROL OPERATION ASSOCIATED WITH A FIRST APPLICATION IN A SECOND APPLICATION

(71) Applicant: LG ELECTRONICS INC., Seoul (KR)

(72) Inventors: Kyunghye Seo, Seoul (KR); Namki Kim, Seoul (KR); Yoonseok Yang, Seoul (KR); Sesook Oh, Seoul (KR); Kyungjin Moon, Seoul (KR); Jian Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 15/710,756

(22) Filed: Sep. 20, 2017

(65) Prior Publication Data
US 2018/0121065 A1 May 3, 2018

(30) Foreign Application Priority Data
Nov. 2, 2016 (KR) .......................... 10-2016-0145348

(51) Int. Cl.
*G06F 3/0484* (2013.01)
*G06F 9/451* (2018.01)
*G06F 3/0481* (2013.01)
*G06F 3/0488* (2013.01)

(52) U.S. Cl.
CPC ...... *G06F 3/04845* (2013.01); *G06F 3/04817* (2013.01); *G06F 3/04883* (2013.01); *G06F 9/451* (2018.02); *G06F 2203/04803* (2013.01)

(58) Field of Classification Search
CPC .. G06F 3/04845; G06F 9/451; G06F 3/04817; G06F 3/04883
See application file for complete search history.

(56) References Cited

U.S. PATENT DOCUMENTS

| 2010/0037167 A1* | 2/2010 | Son | G06F 3/0486 715/769 |
| 2016/0196006 A1* | 7/2016 | Doan | G06F 3/0481 715/779 |

* cited by examiner

*Primary Examiner* — Cesar B Paula
*Assistant Examiner* — Konrad J Kulikowski
(74) *Attorney, Agent, or Firm* — Lee Hong Degerman Kang & Waimey

(57) ABSTRACT

A mobile terminal for executing applications and a method of controlling the same are provided. The mobile terminal includes a display unit changing a first object to a floating state where the first object is separated from an execution screen for a first application, based on a predetermined user input being applied to the first object for executing a first control operation which is being displayed on the execution screen for the first application, and displaying the first object on an execution screen for a second application which is executed after the first application ends, and a control unit executing a control operation associated with the first control operation, based on the predetermined user input being applied to the first object which is being displayed on the execution screen for the second application.

19 Claims, 33 Drawing Sheets

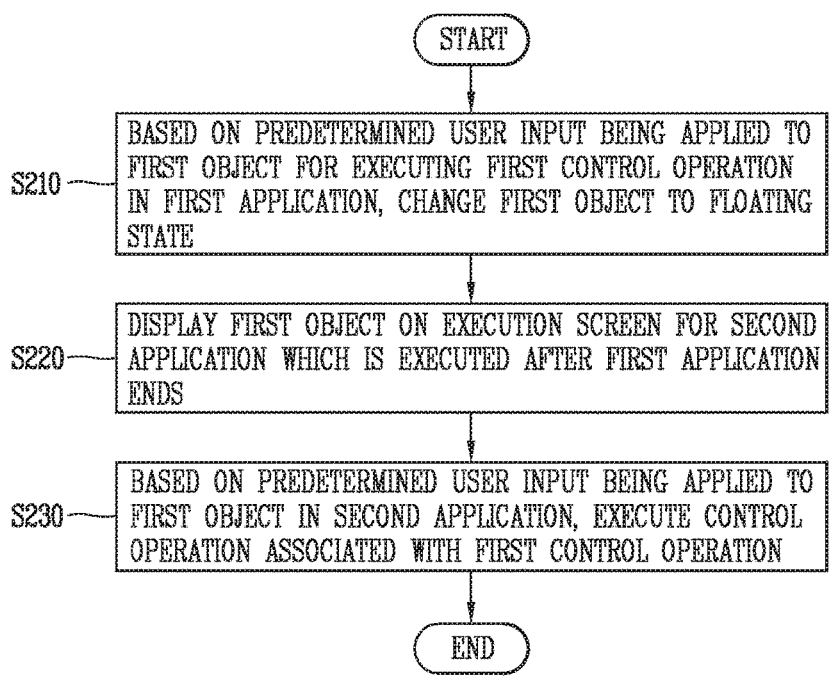

FIG. 30
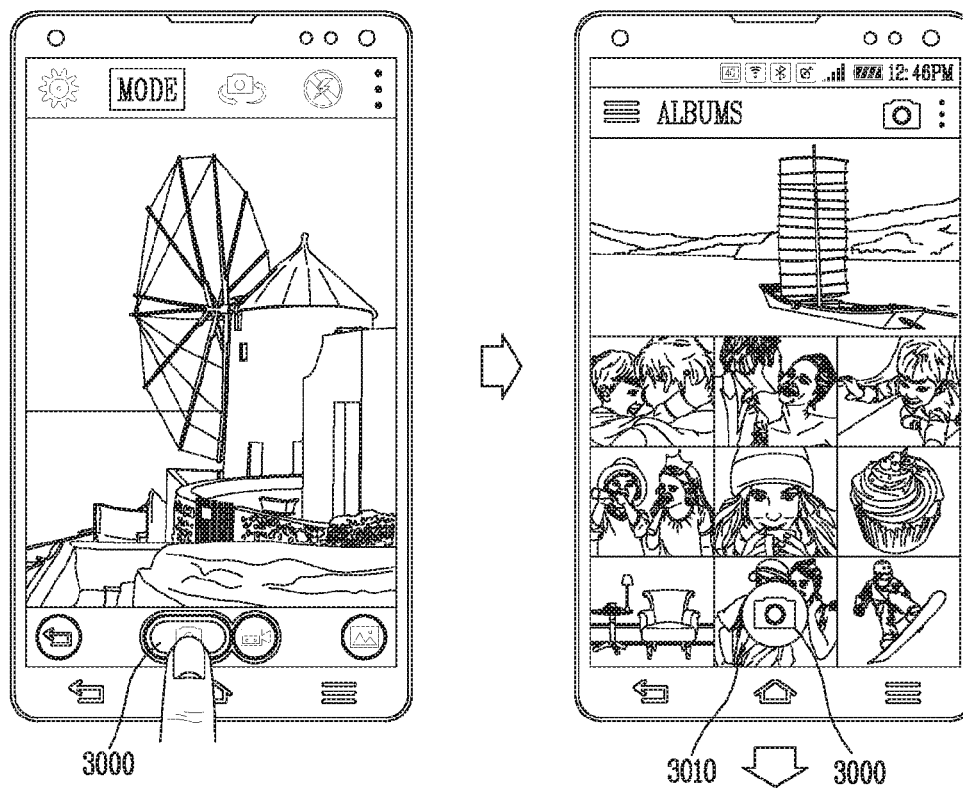
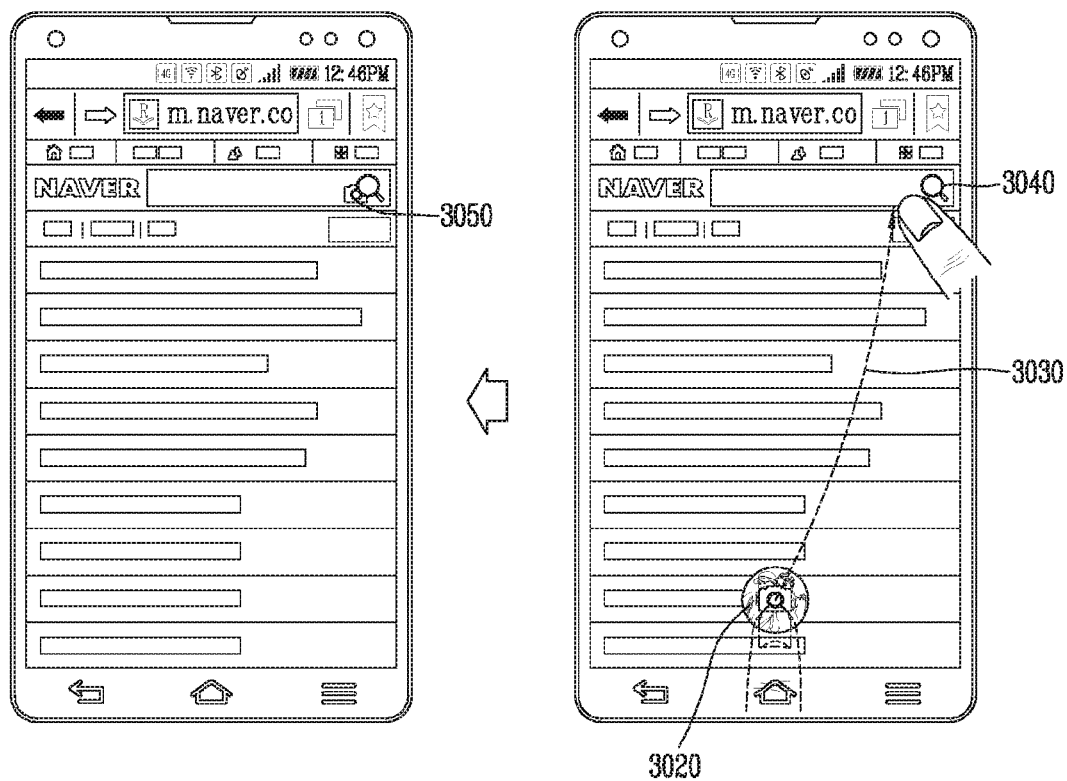

MOBILE TERMINAL AND METHOD FOR EXECUTING A CONTROL OPERATION ASSOCIATED WITH A FIRST APPLICATION IN A SECOND APPLICATION

CROSS-REFERENCE TO RELATED APPLICATIONS

Pursuant to 35 U.S.C. § 119(a), this application claims the benefit of earlier filing date and right of priority to Korean Application No. 10-2016-0145348, filed on Nov. 2, 2016, the contents of which are incorporated by reference herein in their entirety.

BACKGROUND OF THE DISCLOSURE

1. Field of the Disclosure

The present disclosure relates to a mobile terminal for executing applications and a method of controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In mobile terminals, a case of sequentially executing a plurality of applications can be needed for executing a specific function. In this case, an execution time can be delayed. Also, since a user should continuously input control commands, the mobile terminals cause inconvenience of users.

SUMMARY OF THE DISCLOSURE

Therefore, an aspect of the detailed description is to provide a mobile terminal capable of separating a control button from an application in a floating state, outputting the control button from another application, and executing control operations correlated with each other between the applications by using the separated control button, and a method for controlling the same.

To achieve these and other advantages and in accordance with the purpose of this specification, as embodied and broadly described herein, a mobile terminal includes: a display unit changing a first object to a floating state where the first object is separated from an execution screen for a first application, based on a predetermined user input being applied to the first object for executing a first control operation which is being displayed on the execution screen for the first application, and displaying the first object on an execution screen for a second application which is executed after the first application ends; and a control unit executing a control operation associated with the first control operation, based on the predetermined user input being applied to the first object which is being displayed on the execution screen for the second application.

In an embodiment, the control unit may end an output of the first object, based on the predetermined user input being applied to the first object changed to the floating state.

In another embodiment, the control unit may change an output position of the first object, based on the predetermined user input being applied to the first object changed to the floating state.

In another embodiment, based on the predetermined user input being applied to a second object which is being displayed on the execution screen for the second application, the control unit may change the second object to the floating state and may allow the first object and the second object to be displayed on an execution screen for a third application which is executed after the second application ends.

In another embodiment, the control unit may allow information associated with the first application to be displayed on the first object and may allow information associated with the second application to be displayed on the second object.

In another embodiment, based on the predetermined user input being applied to a send icon which is being displayed on a dialog window of a message send application, the control unit may change the send icon to the floating state and may allow the send icon to be displayed on an execution screen for a specific application which is executed after the message send application ends.

In another embodiment, a user input for selecting at least one piece of content which is being on the execution screen for the specific application may be applied, and based on the predetermined user input being applied to the send icon, the control unit may send the selected at least one piece of content to at least one other terminal exchanging messages in the dialog window.

In another embodiment, based on the predetermined user input being applied to a search window which is being displayed on an execution screen for a browser application, the control unit may change the search window to the floating state and may allow the search window to be displayed on an execution screen for a specific application which is executed after the browser application ends.

In another embodiment, based on keywords being input to the search window which is being displayed on the execution screen for the specific application, the control unit may allow a result of a search for the keywords to be displayed in the specific application.

In another embodiment, based on the predetermined user input being applied to at least one calculation sign icon which is being displayed on an execution screen for a calculator application, the control unit may change the at least one calculation sign icon to the floating state and may allow the at least one calculation sign icon to be displayed on an execution screen for a specific application which is executed after the calculator application ends, and based on a user input for sequentially selecting the at least one calculation sign icon and a plurality of displayed number signs capable of being calculated being applied to the execution screen for the specific application, the control unit may allow a calculation result to be displayed.

In another embodiment, based on the predetermined user input being applied to a photographing icon which is being displayed on an execution screen for a camera application, the control unit may change the photographing icon to the floating state and may allow the photographing icon to be displayed on an execution screen for a specific application which is executed after the camera application ends.

In another embodiment, based on the predetermined user input being applied to the photographing icon which is being displayed on the execution screen for the specific application, the control unit may capture and store the execution screen for the specific application.

In another embodiment, a user input for selecting at least one piece of content which is being on the execution screen for the specific application may be applied, and based on the predetermined user input being applied to the photographing icon, the control unit may capture and store the selected at least one piece of content.

In another embodiment, the control unit may allow the photographing icon to be displayed on a dialog window of a message send application which is executed after the camera application ends, and based on the predetermined user input being applied to the photographing icon, the control unit may allow the photographing icon to be displayed on at least one other terminal exchanging messages in the dialog window.

In another embodiment, based on the predetermined user input being applied to a first object which is being displayed in the floating state on the execution screen for the second application and a second object for executing a second control operation in the second application, the control unit may execute a control operation associated with the first control operation and the second control operation in the second application.

In another embodiment, based on the predetermined user input being applied to the first object and the second object, the control unit may output a new synthesis object having the floating state corresponding to the first object and the second object.

In another embodiment, based on the predetermined user input being applied to the new synthesis object, the control unit may execute the associated control operation in the second application.

In another embodiment, based on the predetermined user input being applied to the new synthesis object, the control unit may execute a control operation corresponding to the associated control operation in a third application which is executed after the second application ends.

In another aspect of the present invention, a method of controlling a mobile terminal includes: (a) based on a predetermined user input being applied to a first object for executing a first control operation which is being displayed on an execution screen for a first application, changing the first object to a floating state where the first object is separated from the execution screen for the first application; (b) displaying the first object on an execution screen for a second application which is executed after the first application ends; and (c) based on the predetermined user input being applied to the first object which is being displayed on the execution screen for the second application, executing a control operation associated with the first control operation.

In an embodiment, step (a) may include ending an output of the first object, based on the predetermined user input being applied to the first object changed to the floating state.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2 is a conceptual diagram for describing a method of controlling a mobile terminal according to the present invention;

FIG. 30 is a conceptual diagram for describing an embodiment where an image is searched for in a browser application, based on a synthesis button obtained by synthesizing a separated photographing button and a selection image;

DETAILED DESCRIPTION OF THE DISCLOSURE

Figure 1A:
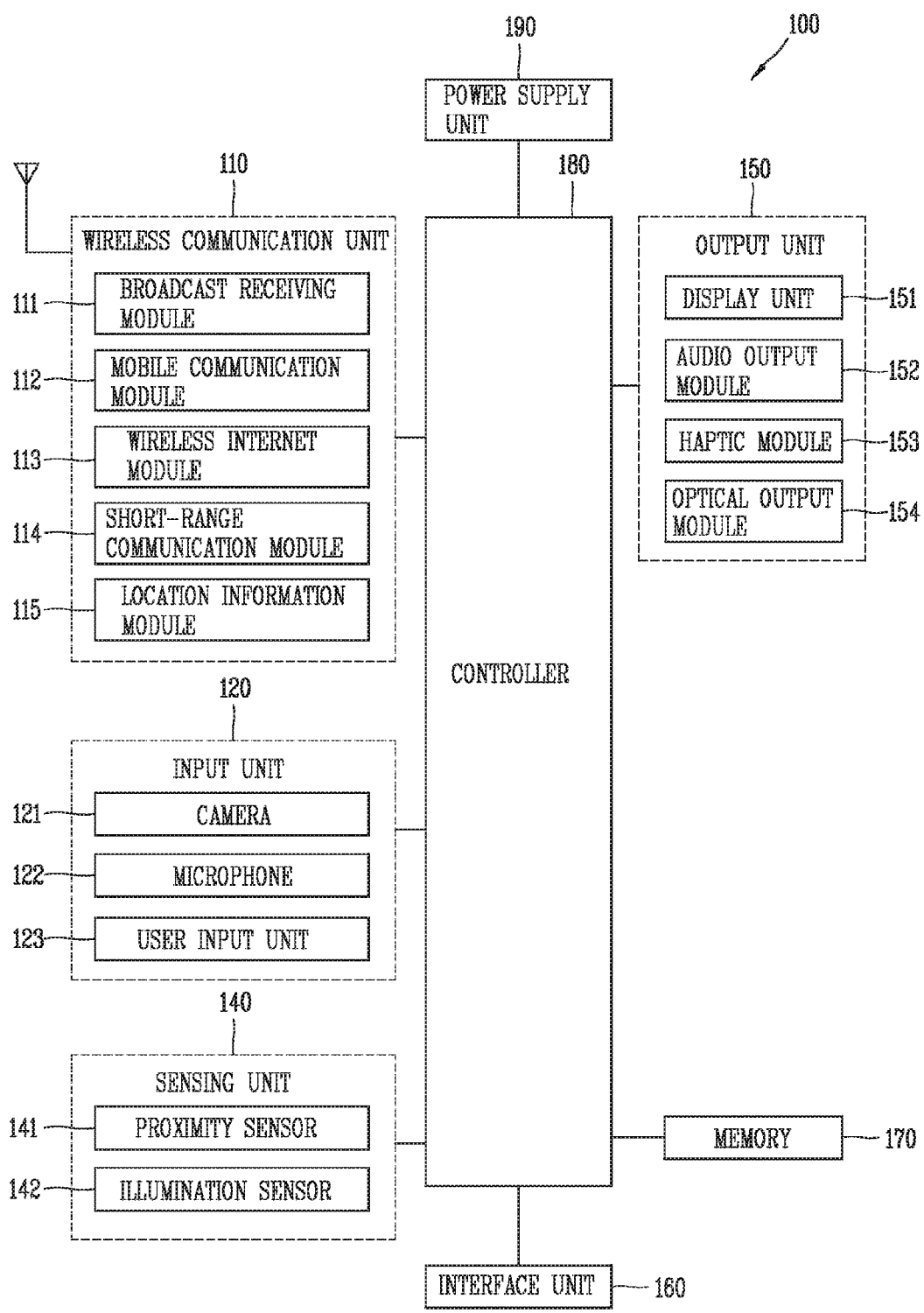
FIG. 1A is a block diagram for describing a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
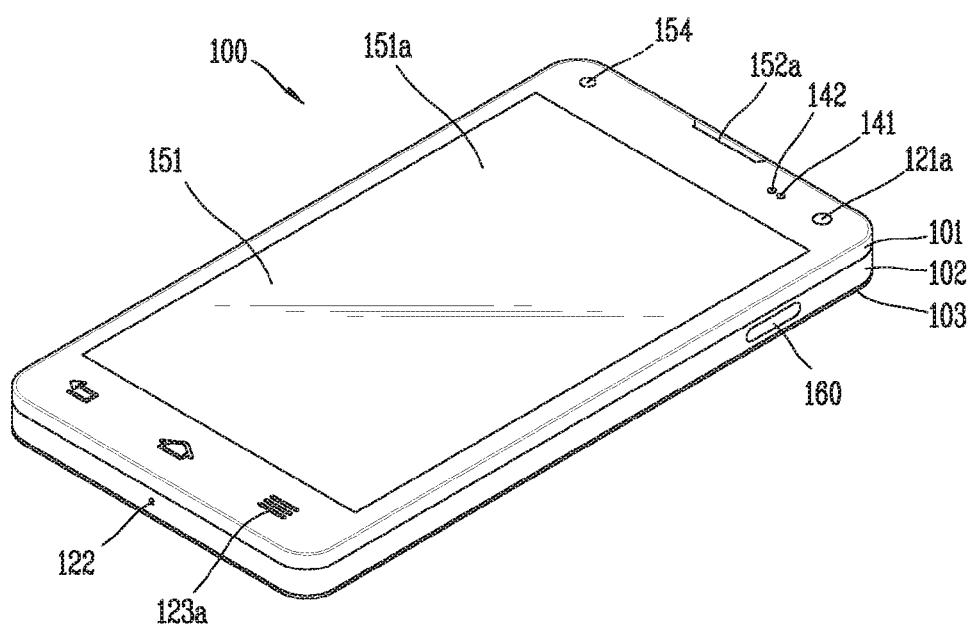
FIGS. 1B and 1C are conceptual diagrams when a mobile terminal according to the present invention is seen in different directions.
Figure 1C:
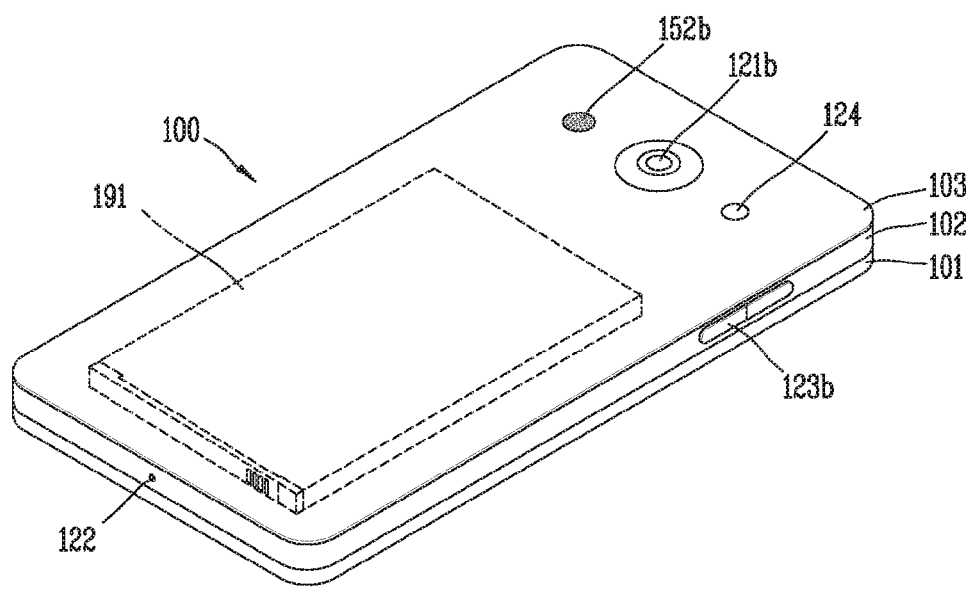

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143*a*, 143*b* are provided at the mobile terminal 100 to more precisely sense a position and a direction of an object which generates a magnetic field.

For this, the plurality of 3-axis magnetic sensors 143*a*, 143*b* may be independent from each other, and may be spaced from each other in different directions. The controller 180 may execute a differentiated operation based on a size of a magnetic field measured by the plurality of 3-axis magnetic sensors 143*a*, 143*b*. More specifically, the controller 180 may detect a position, a direction, an angle, etc. of an object which generates a magnetic field, based on a size of a magnetic field measured by the plurality of 3-axis magnetic sensors 143*a*, 143*b*.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
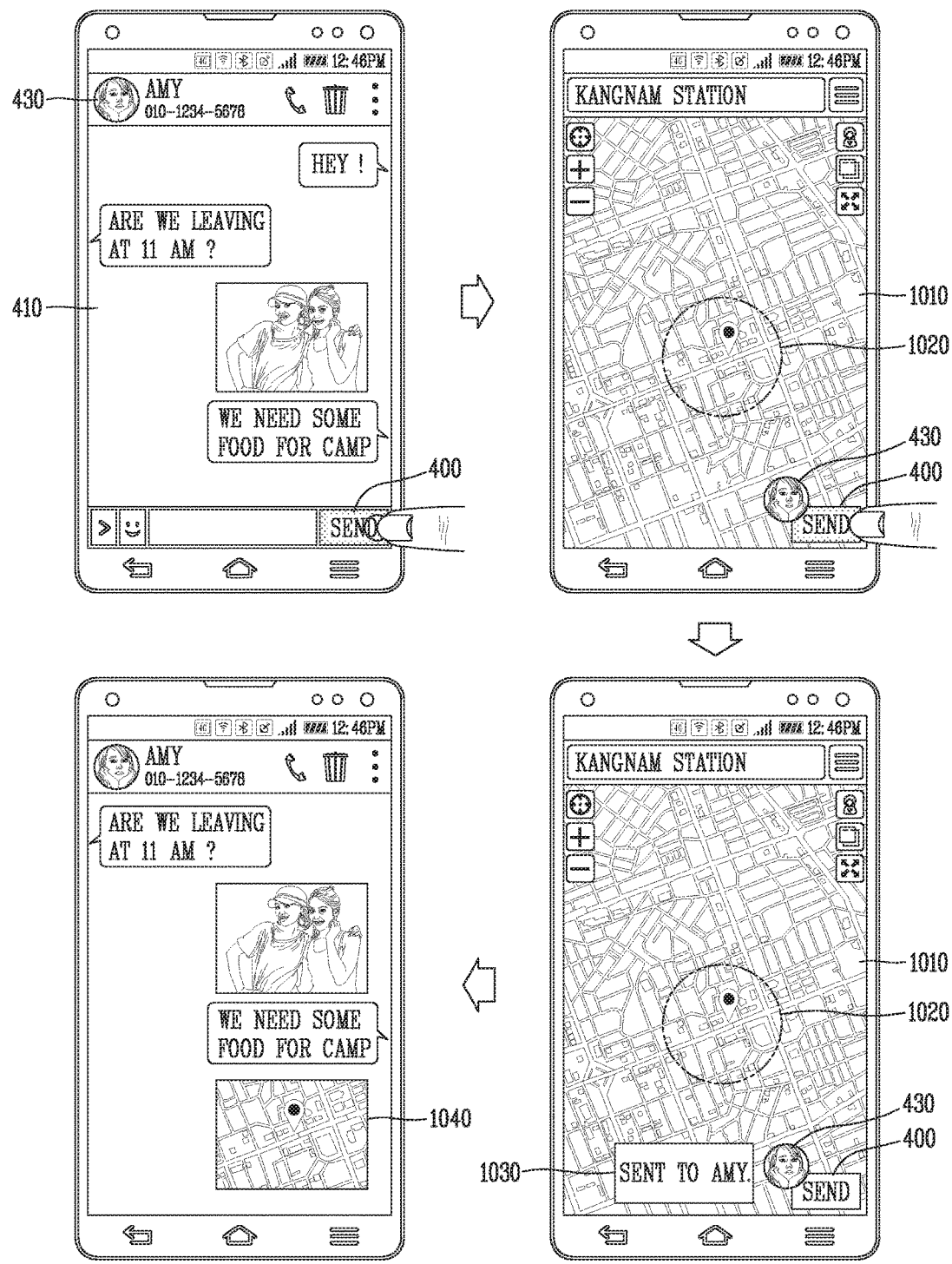
FIG. 10 is a conceptual diagram for describing an embodiment where a send button separated from a messenger application is applied to a wayfinding application.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 2 is a conceptual diagram for describing a method of controlling a mobile terminal according to the present invention.

Referring to FIG. 2, first, based on a predetermined user input being applied to a first object for executing a first control operation which is being displayed on an execution screen for a first application, the first object may be changed to a floating state where the first object is separated from the execution screen for the first application in operation S210.

The first object may be defined for executing a specific control operation in the first application such as an icon, a menu, or a search window.

Moreover, the floating state may be defined as a state where the first object is independently separated from the execution screen for the first application. That is, a first icon changed to the floating state may be continuously displayed even when execution of the first application ends, and its position may be changed by a drag input or the like.

Subsequently, in operation S220, the first object may be displayed on an execution screen for a second application which is executed after the first application ends.

Subsequently, based on the predetermined user input being applied to the first object which is being displayed on the execution screen for the second application, a control operation associated with the first control operation may be executed in operation S230.

That is, before separated from an execution screen for the first application in the floating state, a control operation associated with a control operation executed in the first application may be executed in the second application.

In another embodiment, operation S210 may include an operation of ending an output of the first object, based on the predetermined user input being applied to the first object changed to the floating state.

Hereinafter, a detailed embodiment will be described with reference to the drawings.

Based on the predetermined user input being applied to the first object for executing the first control operation which is being displayed on the execution screen for the first application, the display unit 151 may change the first object to the floating state and may display the first object on the execution screen for the second application which is executed after the first application ends.

Based on the predetermined user input being applied to the first object which is being displayed on the execution screen for the second application, the control unit 180 may execute a control operation associated with the first control operation.

In an embodiment, based on the predetermined user input being applied to the first object changed to the floating state, the control unit 180 may end the output of the first object.

In another embodiment, based on the predetermined user input being applied to the first object changed to the floating state, the control unit 180 may change an output position of the first object.

Figure 3:
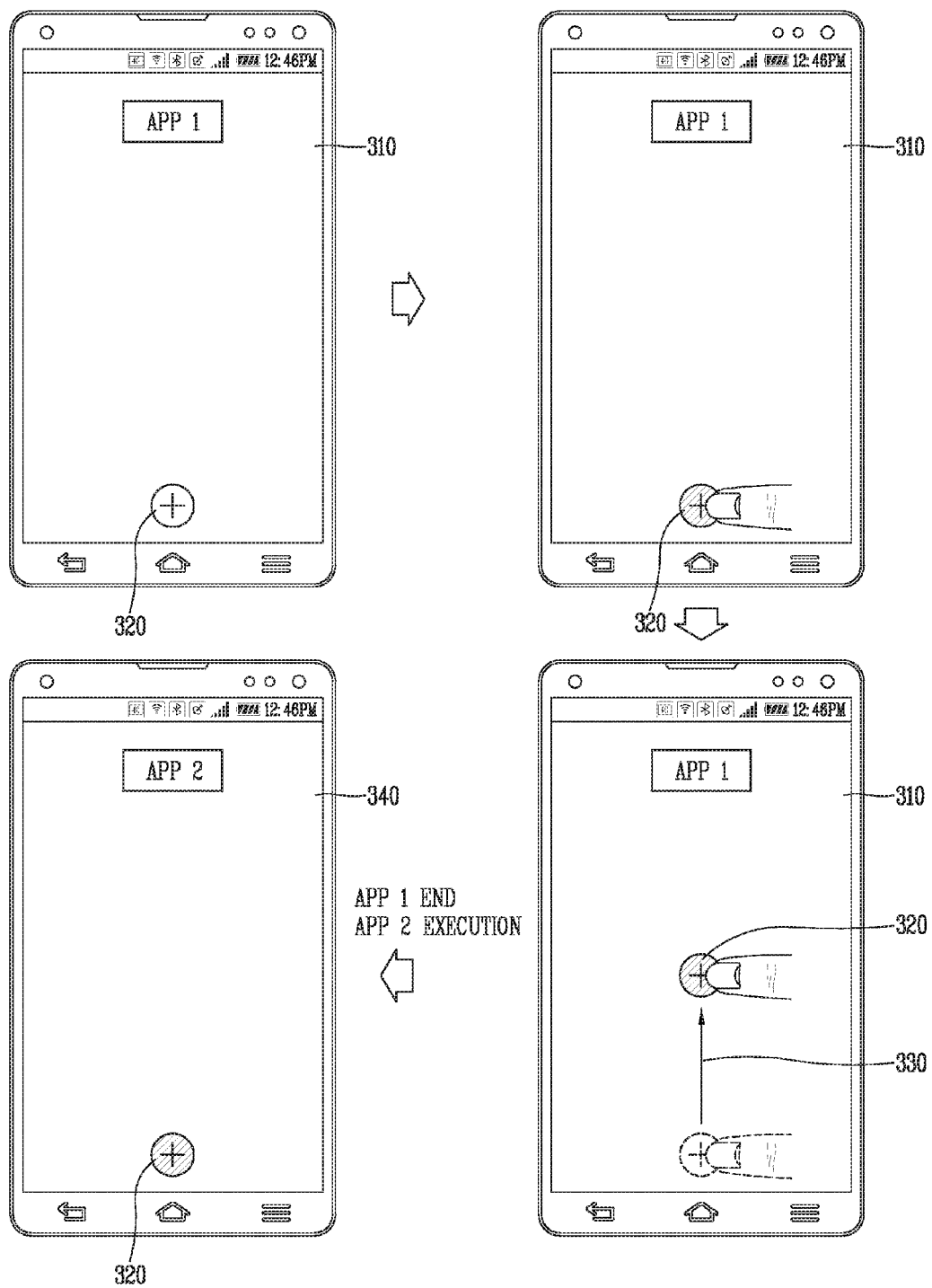
FIG. 3 is a conceptual diagram for describing an embodiment where a control button is separated from an application in a floating state.

FIG. 3 is a conceptual diagram for describing an embodiment where a control button is separated from an application in a floating state.

Referring to FIG. 3, a first icon 320 for executing a predetermined first control operation may be displayed on an execution screen 310 for a first application. At this time, when the predetermined user input is applied to the first icon 320, the first control operation may be executed in the first application.

For example, when a touch input is applied to a photographing icon which is being displayed on an execution screen for a camera application, an image or video may be captured. In another embodiment, when a touch input is applied to a send icon which is being displayed on an execution screen for a messenger application, created message and content may be sent to a third dialog party.

When a predetermined user input is applied to the first icon 320, the first icon 320 may be changed to a floating state. The floating state may be defined as a state where the first object 320 is independently separated from the execution screen 310 for the first application.

As a result, the first icon 320 changed to the floating state may be continuously displayed even when execution of the first application ends, and its position may be changed by a drag input or the like.

In another embodiment, when a force touch input is applied to the first icon 320, a shape, size, color, etc. of the first icon 320 may be changed, or a flickering effect, an emphasis effect, a shade effect, etc. may be displayed on an edge, and the first icon 320 may be separated from the execution screen 310 for the first application.

In another embodiment, when the force touch input is again applied to the first icon 320 changed to the floating state, the floating state may be released. Therefore, the first icon 320 may disappear.

In another embodiment, when a drag input 330 is applied to the first icon 320 changed to the floating state, the first icon 320 may move to a position to which the drag input is applied.

In another embodiment, the first icon 320 may be copied to the position to which the drag input is applied. That is, the first icon may be displayed on each of an initial position and the position to which the drag input is applied.

At this time, the first icon may be display on the initial position, and the first icon which has a changed shape, color, or size and is in the floating state may be displayed on the position to which the drag input is applied.

As described above, the first icon 320 changed to the floating state may be continuously displayed even when the first icon 320 is separated from the execution screen 310 for the first application and execution of the first application ends.

In an embodiment, the first icon 320 changed to the floating state may be displayed on a home screen, which is displayed after the first application ends, or an execution screen 340 for a second application which is subsequently executed.

At this time, the first icon 320 changed to the floating state may be displayed on a predetermined position (for example, a lower middle portion of a screen) in the execution screen 340 for the second application, or may be displayed on a position (for example, a position which is moved by the drag input in a previous step) set by a user.

In a detailed embodiment, when the force touch input is applied to a photographing button (icon) which is being displayed on the execution screen for the camera application, the photographing button may be changed to the floating state where the photographing button is separated from the execution screen for the camera application.

Therefore, the user may apply a drag input to the photographing button to arrange the photographing button at a desired position. Also, as the photographing button is changed to the floating state, the photographing button may be displayed on an execution screen for a browser application which is subsequently executed.

When a predetermined user input is applied to the first icon 320 which is displayed on the execution screen 340 for the second application and is in the floating state, a control operation associated with the first control operation may be executed.

That is, before separated from the execution screen 310 for the first application in the floating state, a control operation associated with a control operation executed in the first application may be executed in the second application.

In a detailed embodiment, the photographing button changed to the floating state in the camera application may be displayed on an execution screen for a browser application. At this time, when a touch input is applied to the photographing button, the execution screen for the browser application may be stored as a capture image. That is, a control operation of capturing the execution screen for the browser application may be executed as a control operation associated with capturing of an image or video.

Based on a predetermined user input being applied to a send icon which is being displayed on a dialog window of a message send application, the control unit 180 may change the send icon to the floating state and may allow the send icon to be displayed on an execution screen for a specific application which is executed after the message send application ends.

In an embodiment, a user input for selecting at least one piece of content which is being on the execution screen for the specific application may be applied, and then, based on the predetermined user input being applied to the send icon, the control unit 180 may send the selected at least one piece of content to at least one other terminal exchanging messages in the dialog window.

Figure 4:
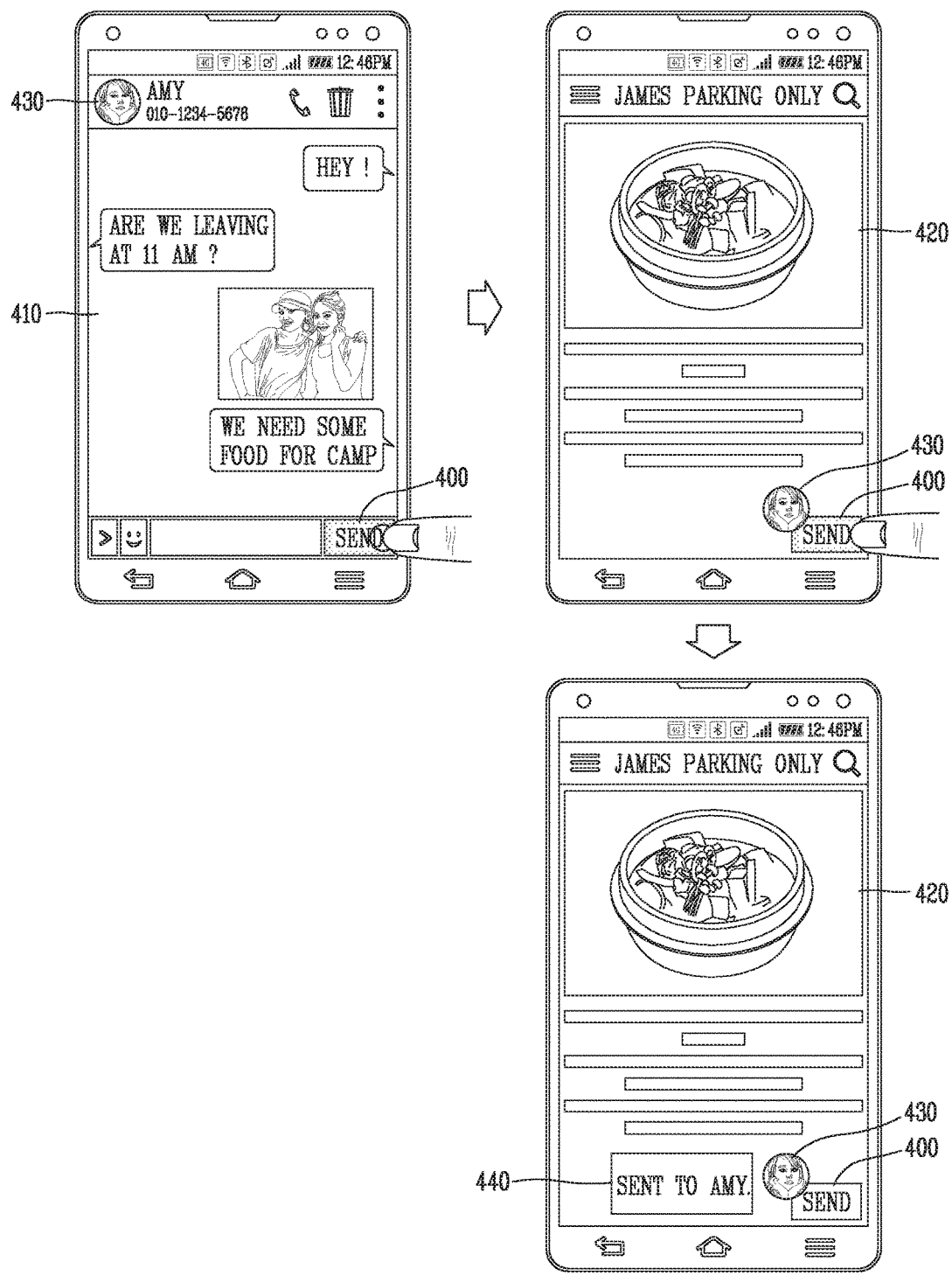
FIG. 4 is a conceptual diagram for describing an embodiment where a send button separated from a messenger application is applied to a browser application.

FIG. 4 is a conceptual diagram for describing an embodiment where a send button separated from a messenger application is applied to a browser application.

Referring to FIG. 4, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

Moreover, the send icon 400 may be separated from the messenger dialog window 410 and may be displayed on a home screen, which is displayed after the messenger application ends, or an execution screen 420 for a browser application which is subsequently executed.

In an embodiment, the send icon 400 may be displayed on a predetermined specific position, for example, a screen right lower end, or may be displayed on a position which is previously designated by a user.

Subsequently, when a touch input is applied to the send icon 400 changed to the floating state, a browser link address or a capturer image obtained by capturing the execution screen 420 for the browser application may be sent to a third dialog party terminal of the messenger dialog window 410. Also, a popup window 440 for informing that the browser link address or the capturer image has been sent to the third dialog party may be displayed.

In another embodiment, if a third dialog party is provided in plurality, the browser link address or the capturer image obtained by capturing the execution screen 420 for the browser application may be sent to terminals of all or some of the plurality of third dialog parties.

In another embodiment, some texts may be selected from the execution screen 420 for the browser application through block designation. Subsequently, when a touch input is applied to the send icon 400, the selected texts may be sent to a terminal of a third dialog party.

Figure 5:
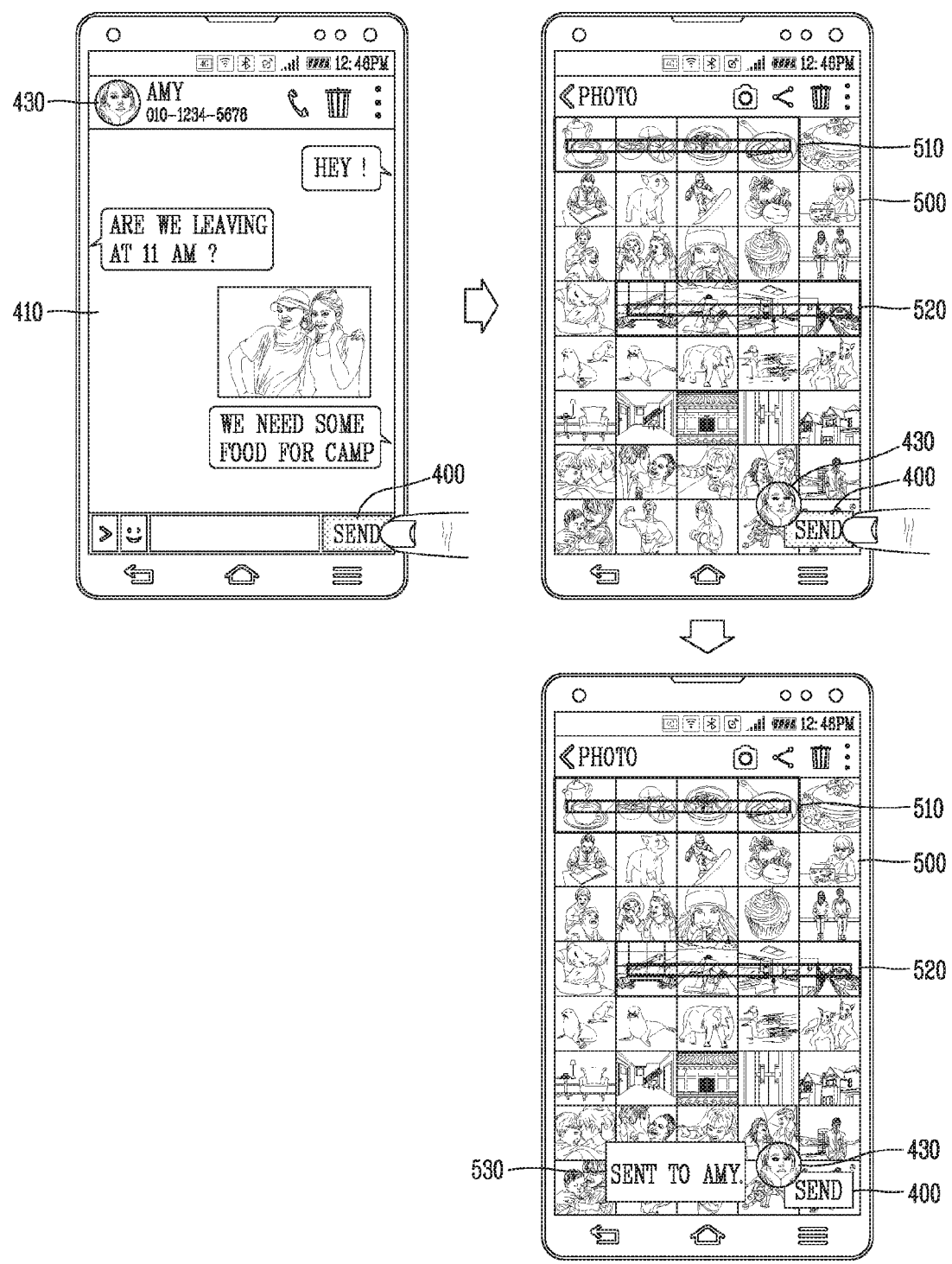
FIGS. 5 and 6 are conceptual diagrams for describing an embodiment where a send button separated from a messenger application is applied to a photograph album application.
Figure 6:
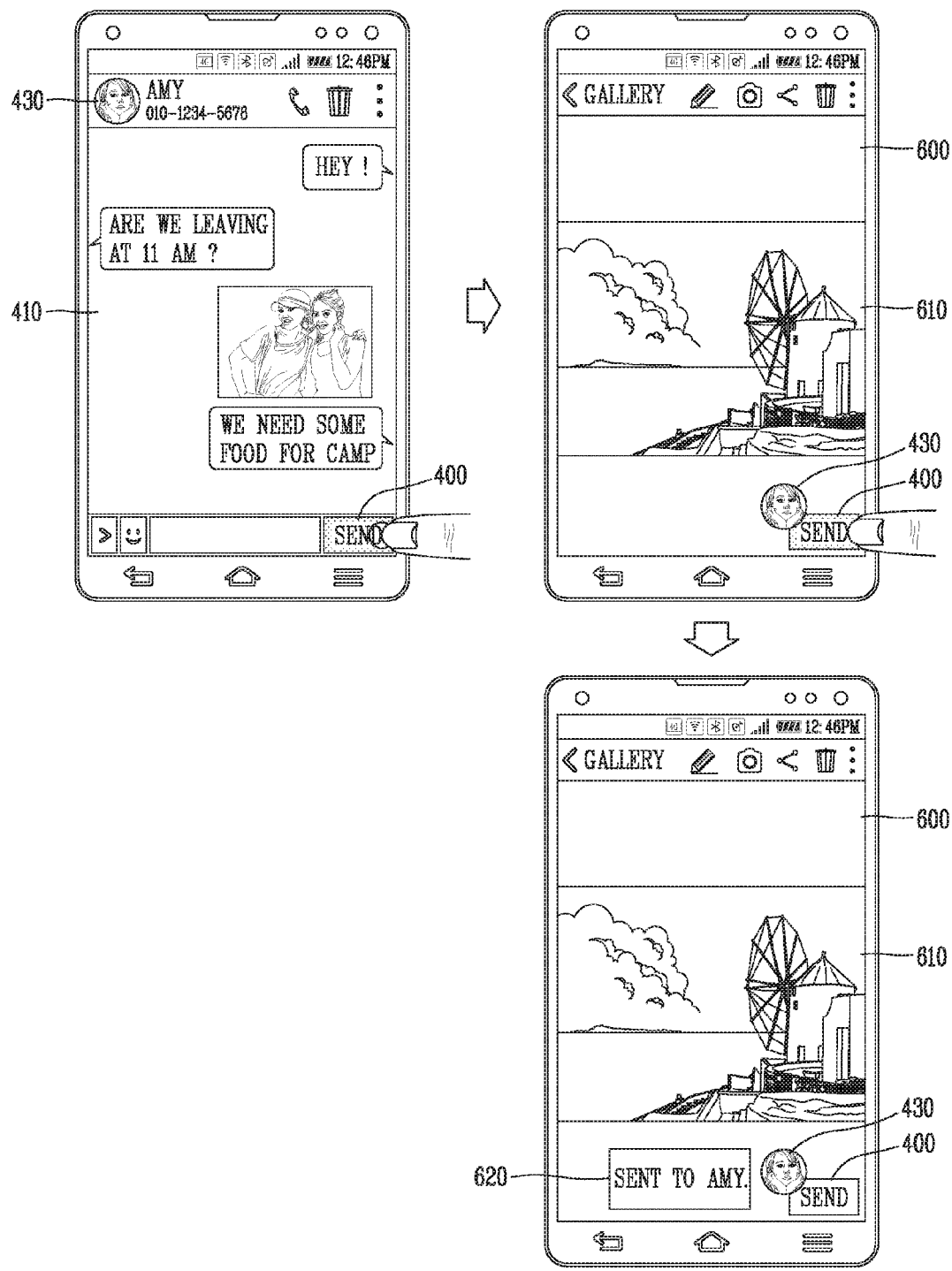

FIGS. 5 and 6 are conceptual diagrams for describing an embodiment where a send button separated from a messenger application is applied to a photograph album application.

Referring to FIG. 5, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

Moreover, the send icon 400 may be separated from the messenger dialog window 410 and may be displayed on a home screen, which is displayed after the messenger application ends, or an execution screen 500 for a photograph album application which is subsequently executed.

In an embodiment, the send icon 400 may be displayed on a predetermined specific position, for example, a screen right lower end, or may be displayed on a position which is previously designated by a user.

Subsequently, an image or video 510 and 520 which is to be sent may be selected from an execution screen 500 for the photograph album application. In an embodiment, when an input which drags after a touch may be applied to a photograph or the video 510 and 520 which is to be sent, a block designation mark may be displayed on the photograph or the video 510 and 520 like a block designating input being applied to a text.

Subsequently, when a touch input is applied to the send icon 400 changed to the floating state, the selected photograph or video 510 and 520 may be sent to terminals of all or some third dialog parties. Also, a popup window 530 for informing that the selected photograph or video has been sent to the third dialog party may be displayed.

In another embodiment, referring to FIG. 6, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

In an embodiment, the send icon 400 may be displayed on a predetermined specific position, for example, a screen right lower end, or may be displayed on a position which is previously designated by a user.

Moreover, the send icon 400 may be separated from the messenger dialog window 410 and may be displayed on a home screen, which is displayed after the messenger application ends, or an execution screen 600 for a photograph album application which is subsequently executed.

In another embodiment, while one photograph or video 610 is being displayed on the execution screen 600 for the photograph album application, a touch input may be applied to the send icon 400 changed to the floating state.

Therefore, the one photograph or video 610 is being displayed may be sent to terminals of all or some third dialog parties of the dialog window 410. Also, a popup window 620 for informing that the one photograph or video has been sent to the third dialog party may be displayed.

Figure 7:
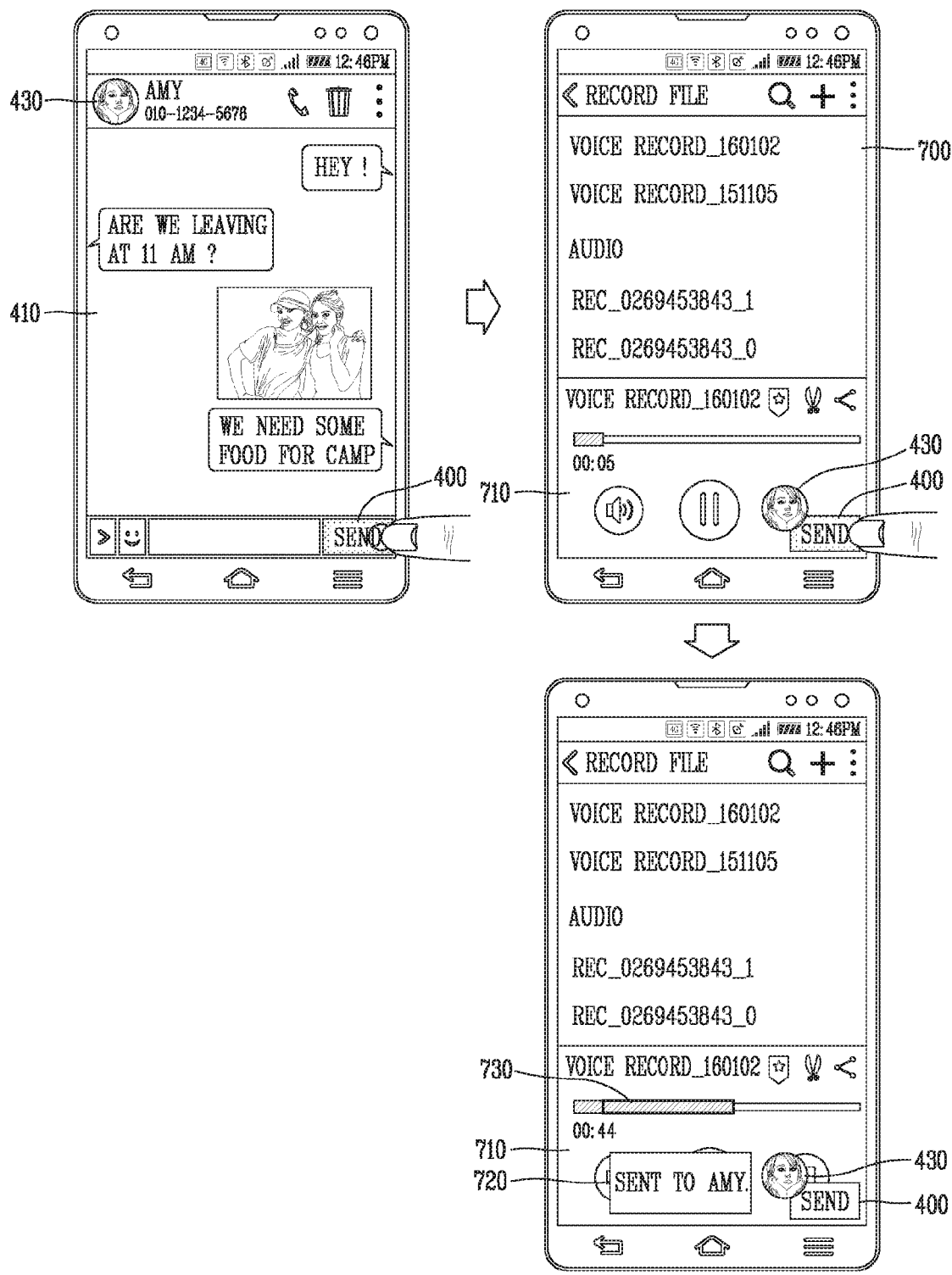
FIG. 7 is a conceptual diagram for describing an embodiment where a send button separated from a messenger application is applied to a voice reproduction application.

FIG. 7 is a conceptual diagram for describing an embodiment where a send button separated from a messenger application is applied to a voice reproduction application.

Referring to FIG. 7, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

In an embodiment, the send icon 400 may be displayed on a predetermined specific position, for example, a screen right lower end, or may be displayed on a position which is previously designated by a user.

Moreover, the send icon 400 may be separated from the messenger dialog window 410 and may be displayed on a home screen, which is displayed after the messenger application ends, or an execution screen 700 for a voice record application which is subsequently executed.

In an embodiment, when a record file is reproduced by displaying a control menu 710 for reproducing the record file, a specific section to send may be selected by applying a long touch input to the send icon 400.

In detail, when the send icon 400 is touched and a finer applying a touch input is detached from the send icon 400 after a certain time elapses, a section 730 of the record file which is reproduced while pressing the send icon 400 may be sent to terminals of all or some third dialog parties of the messenger dialog window 410. Also, a popup window 720 for informing that the section 730 has been sent to the third dialog party may be displayed.

Figure 8:
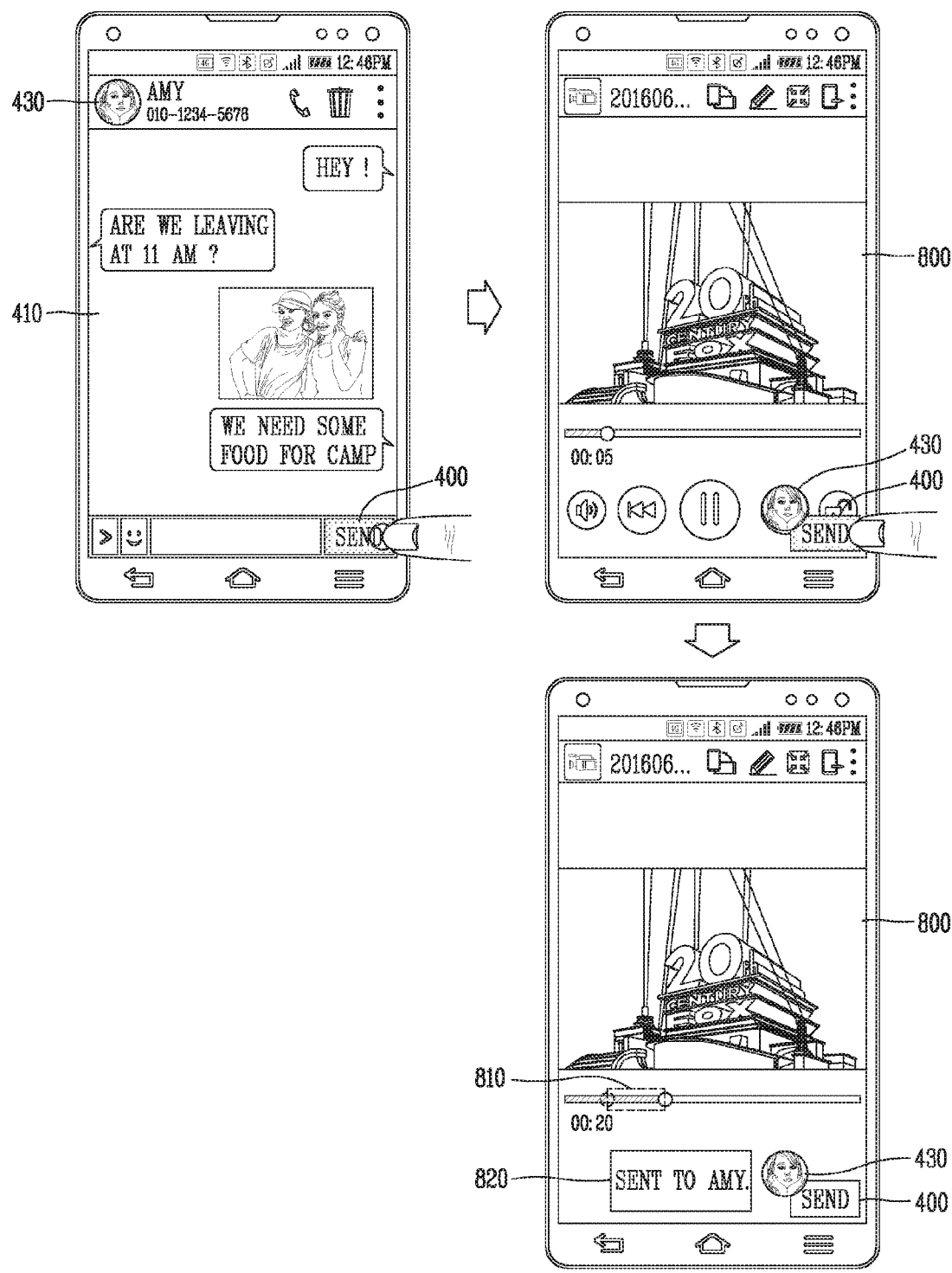
FIG. 8 is a conceptual diagram for describing an embodiment where a send button separated from a messenger application is applied to a video player application.

FIG. 8 is a conceptual diagram for describing an embodiment where a send button separated from a messenger application is applied to a video player application.

Referring to FIG. 8, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

In an embodiment, the send icon 400 may be displayed on a predetermined specific position, for example, a screen right lower end, or may be displayed on a position which is previously designated by a user.

Moreover, the send icon 400 may be separated from the messenger dialog window 410 and may be displayed on a home screen, which is displayed after the messenger application ends, or an execution screen 800 for a video reproduction application which is subsequently executed.

In an embodiment, in a case of reproducing a video file, a specific section to send may be selected by applying a long touch input to the send icon 400.

In detail, when the send icon 400 is touched and a finer applying a touch input is detached from the send icon 400 after a certain time elapses, a section 810 of the video file which is reproduced while pressing the send icon 400 may be sent to terminals of all or some third dialog parties of the messenger dialog window 410. Also, a popup window 820 for informing that the section 810 has been sent to the third dialog party may be displayed.

Figure 9:
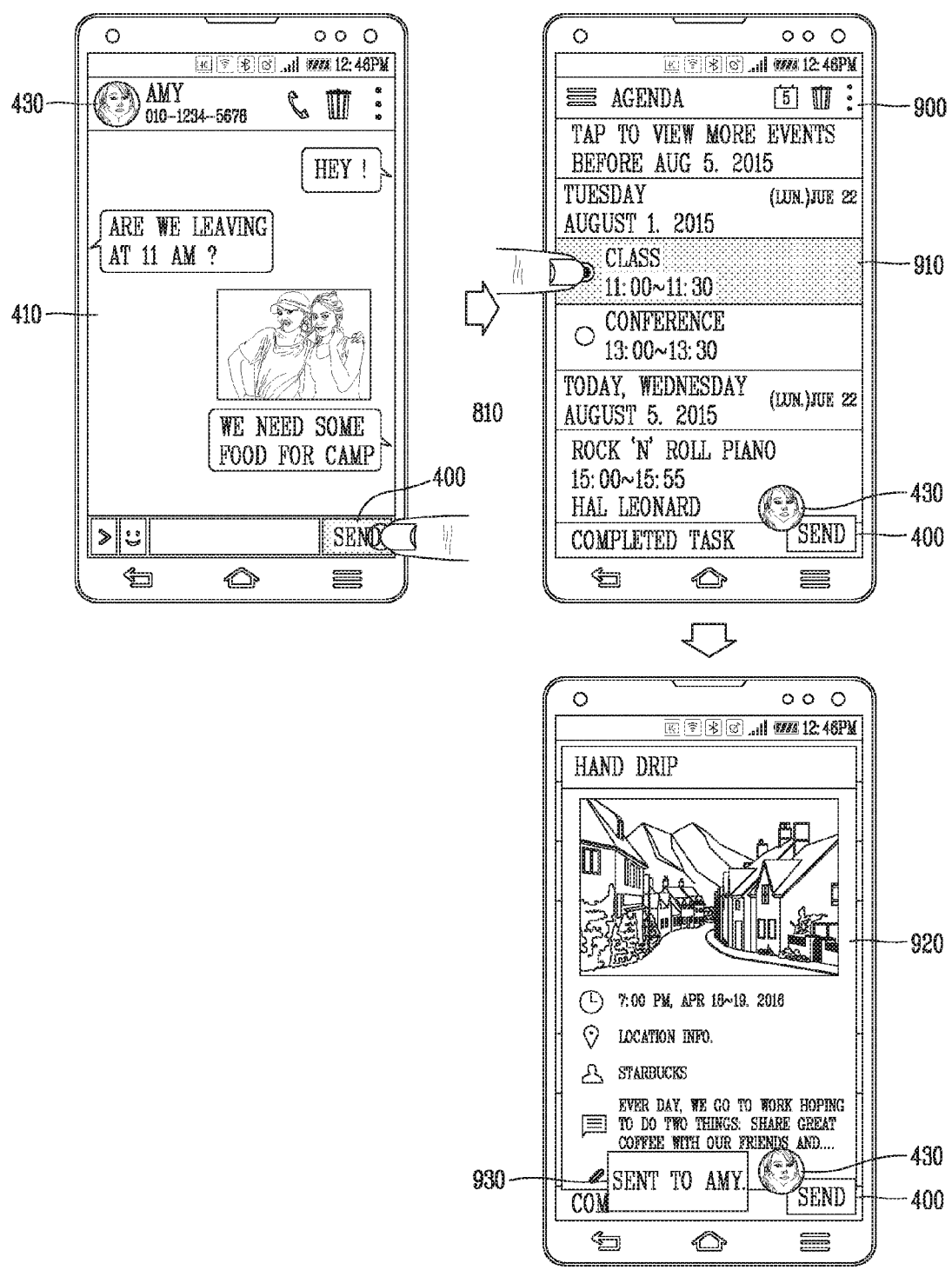
FIG. 9 is a conceptual diagram for describing an embodiment where a send button separated from a messenger application is applied to a scheduling application.

FIG. 9 is a conceptual diagram for describing an embodiment where a send button separated from a messenger application is applied to a scheduling application.

Referring to FIG. 9, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

Moreover, the send icon 400 may be separated from the messenger dialog window 410 and may be displayed on a home screen, which is displayed after the messenger application ends, or an execution screen 900 for a scheduling application which is subsequently executed.

Subsequently, a schedule 910 to send may be selected by applying a touch input to the schedule 910 in the execution screen 900 for the scheduling application, and then, when a touch input is applied to the send icon 400 changed to the floating state, the selected schedule 910 may be sent to terminals of all or some third dialog parties of the messenger dialog window 410. Also, a popup window 930 for informing that the schedule 910 has been sent to the third dialog party may be displayed.

In an embodiment, if the selected schedule 910 is a meeting schedule, information 920 including a meeting place, a meeting time, a meeting person, and other messages may be sent to the terminals of all or some third dialog parties of the messenger dialog window 410.

In another embodiment, a third dialog party to which the meeting schedule 910 has been sent may be added as a meeting participant to the schedule 910 of the scheduling application.

FIG. 10 is a conceptual diagram for describing an embodiment where a send button separated from a messenger application is applied to a wayfinding application.

Referring to FIG. 10, when a force touch input is applied to an execution screen for a messenger application, namely, a send icon 400 of a messenger dialog window 410, the send icon 400 may be changed to a floating state.

In an embodiment, a dialog room name, a third dialog party name, a profile photograph 430, etc. of the messenger dialog window 410 may be displayed on the send icon 400 changed to the floating state.

Moreover, the send icon 400 may be separated from the messenger dialog window 410 and may be displayed on a home screen, which is displayed after the messenger application ends, or an execution screen 1010 for a map (wayfinding) application which is subsequently executed.

Subsequently, a part 1020 to send may be selected from the execution screen 1010 for the map application. In an embodiment, when an input which drags after a touch may be applied to the part 1020 to send, a block designation mark may be displayed on the part 1020 like a block designating input being applied.

Subsequently, when a touch input is applied to the send icon 400 changed to the floating state, the selected part 1020 may be sent to terminals of all or some third dialog parties of the messenger dialog window 410. Also, a popup window 1030 for informing that the selected part 1020 has been sent to the third dialog party may be displayed.

In another embodiment, an image file of the selected part 1020 and text address information 1040 about a corresponding part may be sent to terminals of all or some third dialog parties of the dialog window 410.

Based on a predetermined user input being applied to a second object which is being displayed on an execution screen for a second application, the control unit 180 may change the second object to a floating state and may allow a first object and the second object to be displayed on an execution screen for a third application which is executed after the second application ends.

In an embodiment, the control unit 180 may allow information associated with the first application to be displayed on the first object and may allow information associated with the second application to be displayed on the second object.

Figure 11:
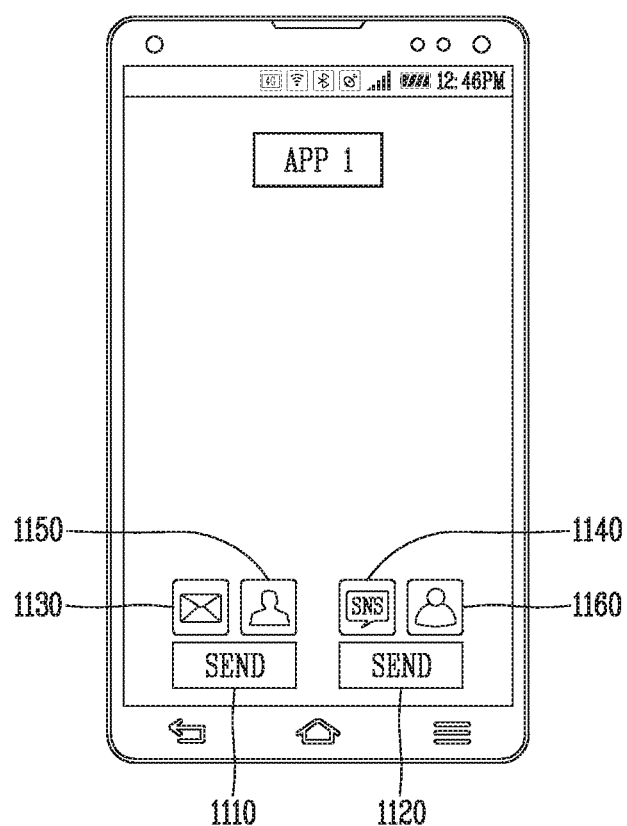
FIG. 11 is a conceptual diagram for describing an embodiment where a plurality of control buttons separated in a floating state are simultaneously output.

FIG. 11 is a conceptual diagram for describing an embodiment where a plurality of control buttons separated in a floating state are simultaneously output.

Referring to FIG. 11, as in the above-described embodiments, when a force touch input is applied to a first send icon 1110 of a message send application, the first send icon 1110 may be changed to a floating state and may be separated from an execution screen for the message send application.

Likewise, when a force touch input is applied to a second send icon 1120 of an SNS application, the second send icon 1120 may be changed to the floating state and may be separated from an execution screen for the SNS application.

Subsequently, when the first application is executed, the first send icon 1110 and the second send icon 1120 may be displayed together.

In another embodiment, icons 1112 and 1122 displaying separated applications may be displayed on the respective icons 1110 and 1120.

In detail, an icon 1130 representing the message send application may be displayed on a position close to the first send icon 1110. Likewise, an icon 1140 representing the SNS application may be displayed on a position close to the second send icon 1120.

In another embodiment, icons 1150 and 1160 displaying message receivers may be displayed on the respective icons 1110 and 1120.

In detail, a profile photograph 1150 of a message send application receiver may be displayed on a position close to the first send icon 1110. Likewise, a profile photograph 1160 of an SNS application third dialog party may be displayed on a position close to the second send icon 1120.

Based on a predetermined user input being applied to a search window which is being displayed on an execution screen for a browser application, the control unit 180 may change the search window to the floating state and may allow the search window to be displayed on an execution screen for a specific application which is executed after the browser application ends.

In an embodiment, based on keywords being input to the search window which is being displayed on the execution screen for the specific application, the control unit 180 may allow a result of a search for the keywords to be displayed in the specific application.

Figure 12:
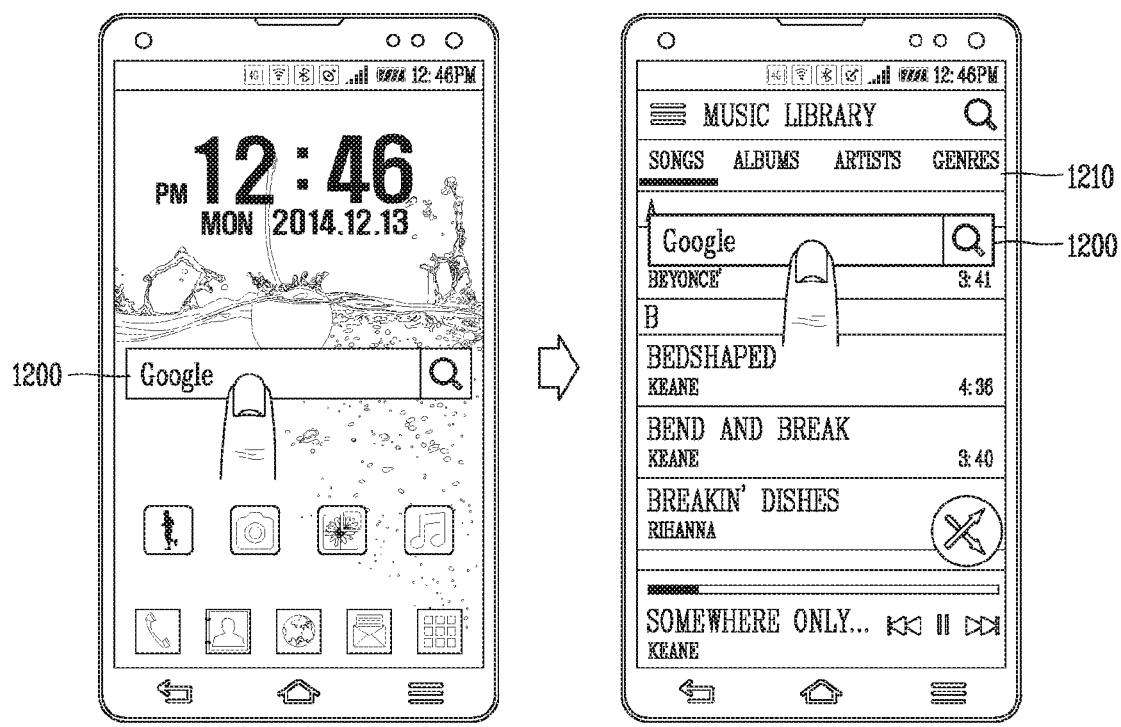
FIG. 12 is a conceptual diagram for describing an embodiment where a search window separated in a floating state is applied to a music reproduction application.

FIG. 12 is a conceptual diagram for describing an embodiment where a search window separated in a floating state is applied to a music reproduction application.

Referring to FIG. 12, when a force touch input is applied to a search window 1200 which is being displayed on a home screen, the search window 1200 may be changed to a floating state.

In an embodiment, when the force touch input is applied to the search window 1200, a shape, size, color, etc. of the search window 1200 may be changed, or a flickering effect, an emphasis effect, a shade effect, etc. may be displayed on an edge, and the search window 1200 may be separated from the home screen.

In another embodiment, when the force touch input is again applied to the search window 1200 changed to the floating state, the floating state may be released. Therefore, the search window 1200 may disappear.

In another embodiment, when a drag input is applied to the search window 1200 changed to the floating state, the search window 1200 may move to a position to which the drag input is applied.

In another embodiment, the search window 1200 may be copied to the position to which the drag input is applied. That is, the search window 1200 may be displayed on each of an initial position and the position to which the drag input is applied.

At this time, the search window 1200 may be display on the initial position, and the search window 1200 which has a changed shape, color, or size and is in the floating state may be displayed on the position to which the drag input is applied.

In an embodiment, the search window 1200 changed to the floating state may be separated from the home screen and may be displayed on an execution screen 1210 for a music reproduction application which is subsequently executed.

At this time, the search window 1200 changed to the floating state may be displayed on a predetermined position (for example, an upper middle portion of a screen) in the execution screen 1210 for the music reproduction application, or may be displayed on a previous position (for example, a position which is moved by the drag input in a previous step) set by a user.

Subsequently, when a music title, a singer name, or a composer name is input to the search window 1200, music may be searched for based on the input. That is, the search window 1210 separated from the home screen may be used to search for music in the music reproduction application.

Based on a predetermined user input being applied to at least one calculation sign icon which is being displayed on an execution screen for a calculator application, the control unit 180 may change the at least one calculation sign icon to the floating state and may allow the at least one calculation sign icon to be displayed on an execution screen for a specific application which is executed after the calculator application ends. Based on a user input for sequentially selecting a plurality of displayed number signs capable of being calculated and the at least one calculation sign icon being applied to the execution screen for the specific application, the control unit 180 may allow a calculation result to be displayed.

Figure 13:
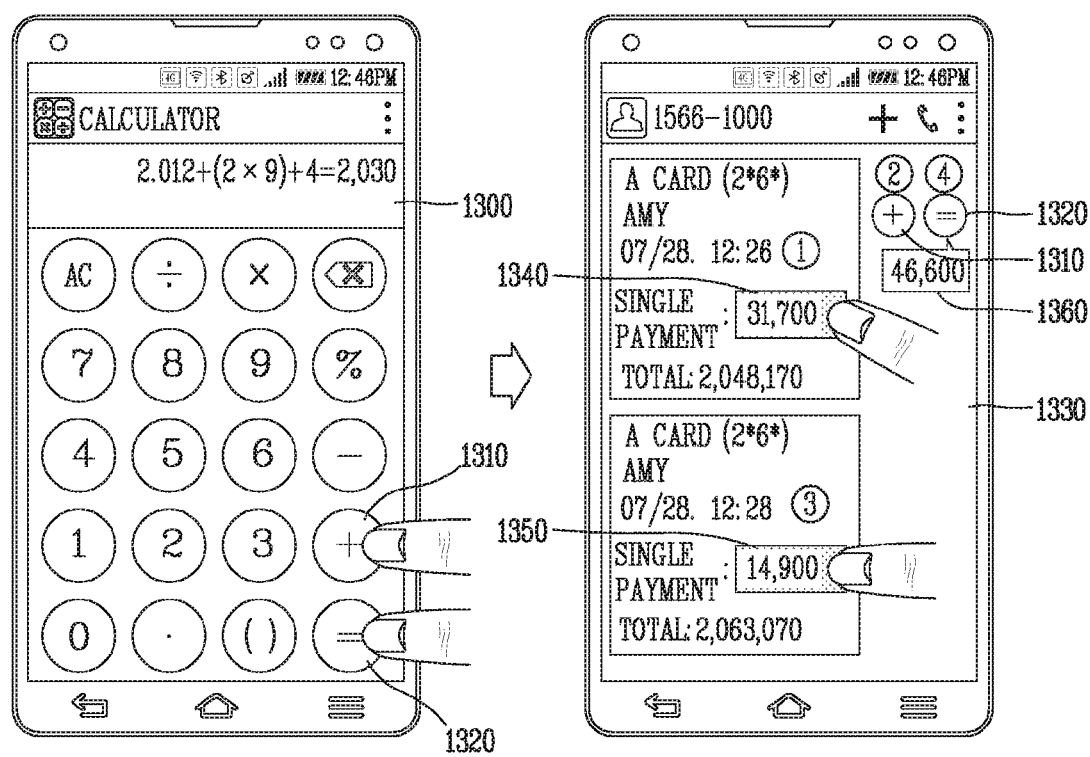
FIG. 13 is a conceptual diagram for describing an embodiment where a calculation sign separated from a calculator application is applied to a messenger application.

FIG. 13 is a conceptual diagram for describing an embodiment where a calculation sign separated from a calculator application is applied to a messenger application.

Referring to FIG. 13, when a force touch input is applied to an addition (+) button 1310 in an execution screen 1300 for a calculator application and is applied to an equal sign (=) button 1320, the addition (+) button 1310 and the equal sign (=) button 1320 may be changed to a floating button.

Therefore, the floating button may be used as a button for calculation in an execution screen 1330 for a message application. In an embodiment, when a drag input is applied to a first item 1340 requiring calculation in the execution screen 1330 for the message application, the first item 1340 may be designated as a block and may be selected.

Subsequently, when a touch input is applied to the addition button 1310 and then a drag input is applied to a second item 1350, the second item 1350 may be designated as a block and may be selected.

Subsequently, when a touch input is applied to the equal sign button 1320, a result obtained by summating the first item 1340 and the second item 1350 may be displayed.

Based on a predetermined user input being applied to a photographing icon which is being displayed on an execution screen for a camera application, the control unit 180 may change the photographing icon to the floating state and may allow the photographing icon to be displayed on an execution screen for a specific application which is executed after the camera application ends.

In an embodiment, based on the predetermined user input being applied to the photographing icon which is being displayed on the execution screen for the specific application, the control unit 180 may capture and store the execution screen for the specific application.

In another embodiment, a user input for selecting at least one piece of content which is being on the execution screen for the specific application may be applied, and then, based on the predetermined user input being applied to the photographing icon, the control unit 180 may capture and store the selected at least one piece of content.

Figure 14:
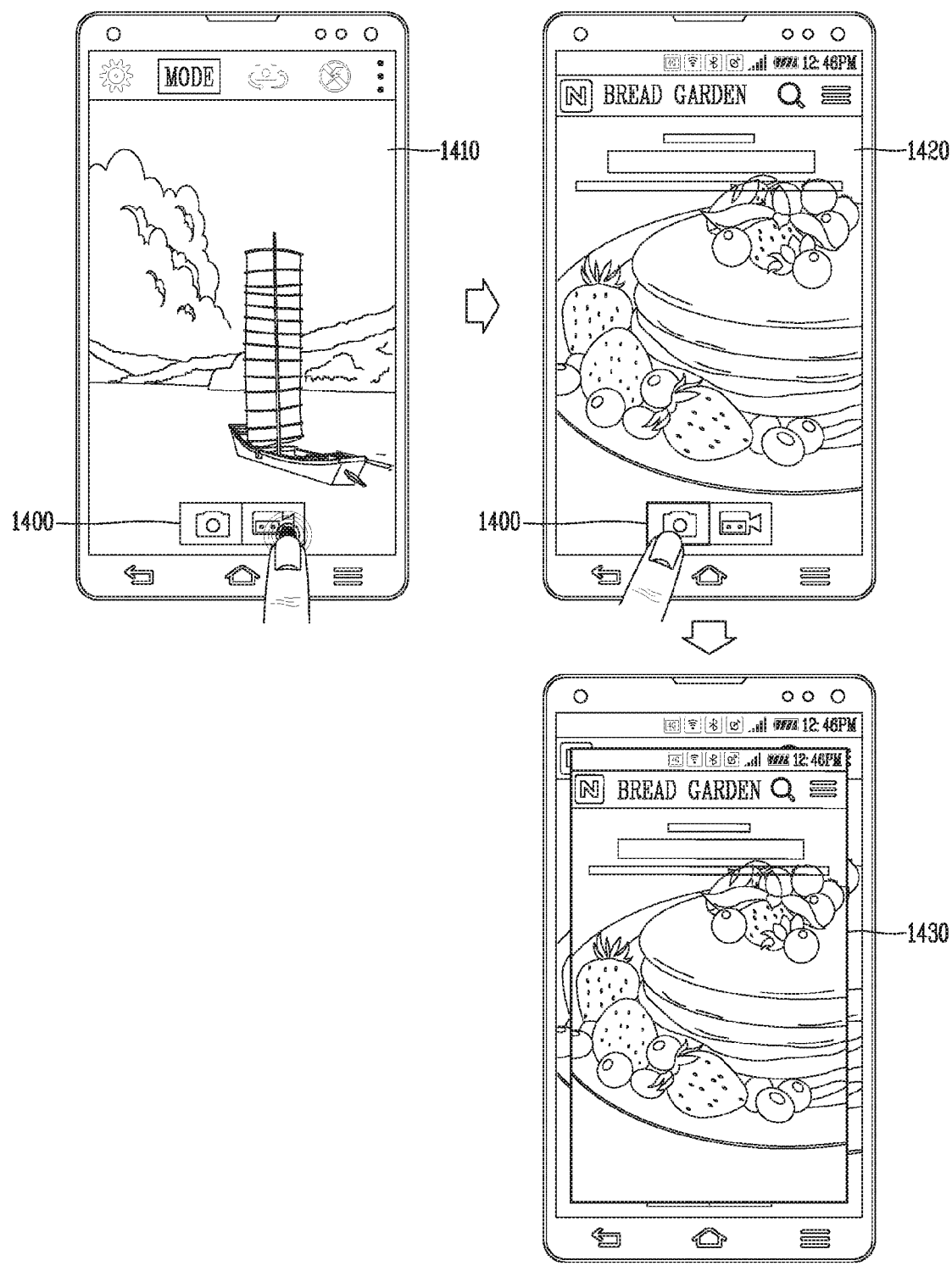
FIG. 14 is a conceptual diagram for describing an embodiment where a photographing button separated from a camera application is applied to a browser application.

FIG. 14 is a conceptual diagram for describing an embodiment where a photographing button separated from a camera application is applied to a browser application.

Referring to FIG. 14, when a force touch input is applied to a photographing button 1400 in an execution screen 1410 for a camera application, the photographing button 1400 may be changed to a floating state and may be separated from the execution screen 1410 for the camera application.

In an embodiment, when the force touch input is applied to the photographing button 1400, a shape, size, color, etc. of the photographing button 1400 may be changed, or a flickering effect, an emphasis effect, a shade effect, etc. may be displayed on an edge, and the photographing button 1400 may be separated from a home screen.

In another embodiment, when the force touch input is again applied to the photographing button 1400 changed to the floating state, the floating state may be released. Therefore, the photographing button 1400 may disappear.

In another embodiment, when a drag input is applied to the photographing button 1400 changed to the floating state, the photographing button 1400 may move to a position to which the drag input is applied.

In another embodiment, the photographing button 1400 may be copied to the position to which the drag input is applied. That is, the photographing button 1400 may be displayed on each of an initial position and the position to which the drag input is applied.

At this time, the photographing button 1400 may be display on the initial position, and the photographing button 1400 which has a changed shape, color, or size and is in the floating state may be displayed on the position to which the drag input is applied.

In another embodiment, the photographing button 1400 changed to the floating state may be separated from the execution screen 1410 for the camera application and may be displayed on the home screen, which is displayed after the camera application ends, and on an execution screen 1420 for a browser application which is subsequently executed.

At this time, the photographing button 1400 changed to the floating state may be displayed on a predetermined position (for example, a lower middle portion of a screen) in the execution screen 1410 for the camera application, or may be displayed on a previous position (for example, a position which is moved by the drag input in a previous step) set by a user.

Subsequently, when a touch input is applied to the photographing button 1400 changed to the floating state, an image 1430 obtained by capturing the execution screen 1420 for the browser application which is being displayed may be generated.

In another embodiment, only content selected from the execution screen 1420 for the browser application may be captured and stored. In detail, a specific image or text may be selected through block designation by applying a touch input thereto, and then, a touch input may be applied to the photographing button 1400. As a result, only the selected content may be stored as a capture image or a text.

That is, the photographing button 1400 separated from the camera application may be used to capture a whole portion or a portion of a screen in the browser application.

The control unit 180 may allow the photographing icon to be displayed on a dialog window of a message send application which is executed after the camera application ends, and based on a predetermined user input being applied to the photographing icon, the control unit 180 may allow the photographing icon to be displayed on at least one other terminal exchanging messages in the dialog window.

Figure 15:
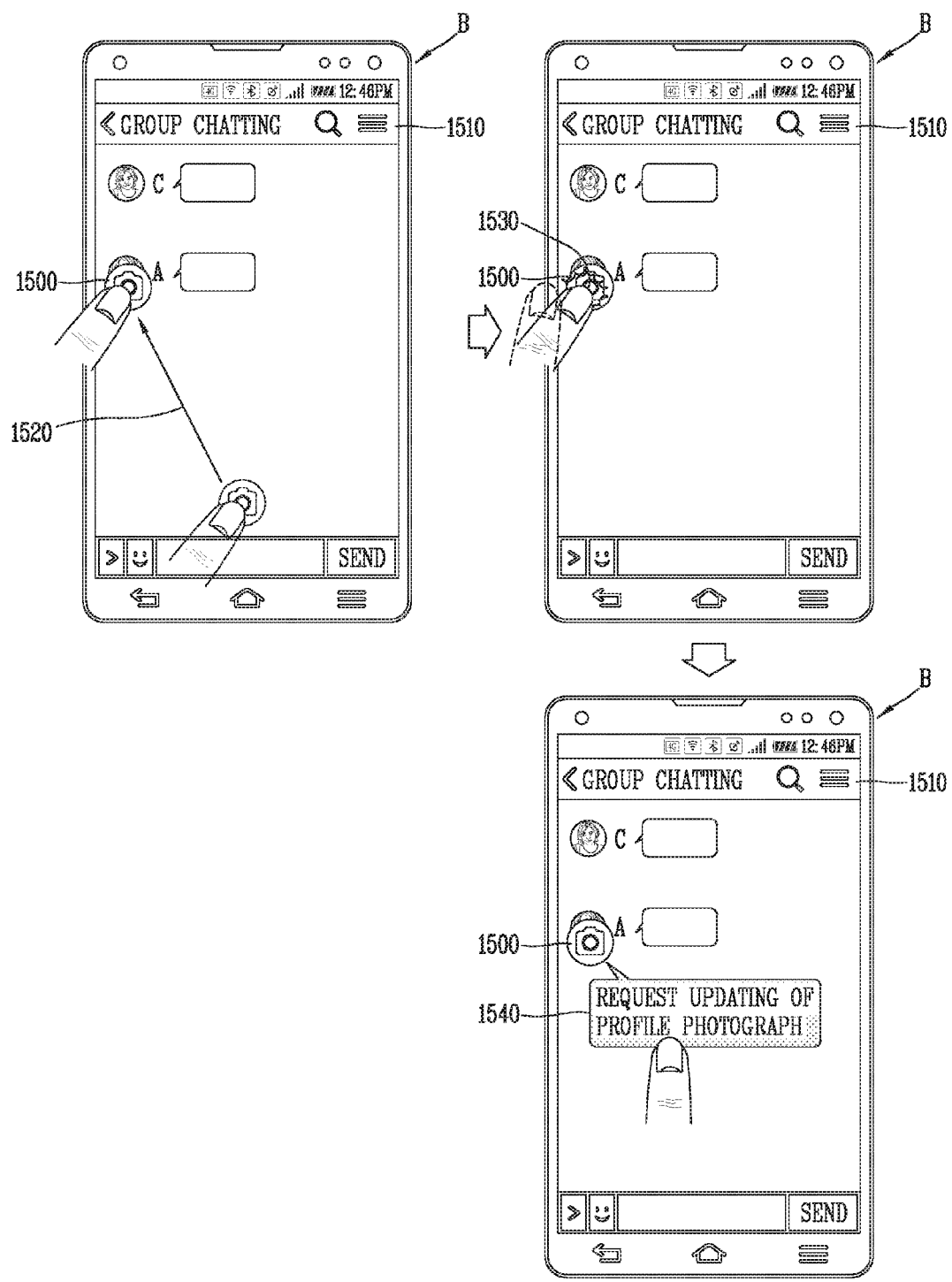
FIGS. 15 to 17 are conceptual diagrams for describing an embodiment where a photographing button is shared in a messenger dialog window.
Figure 16:
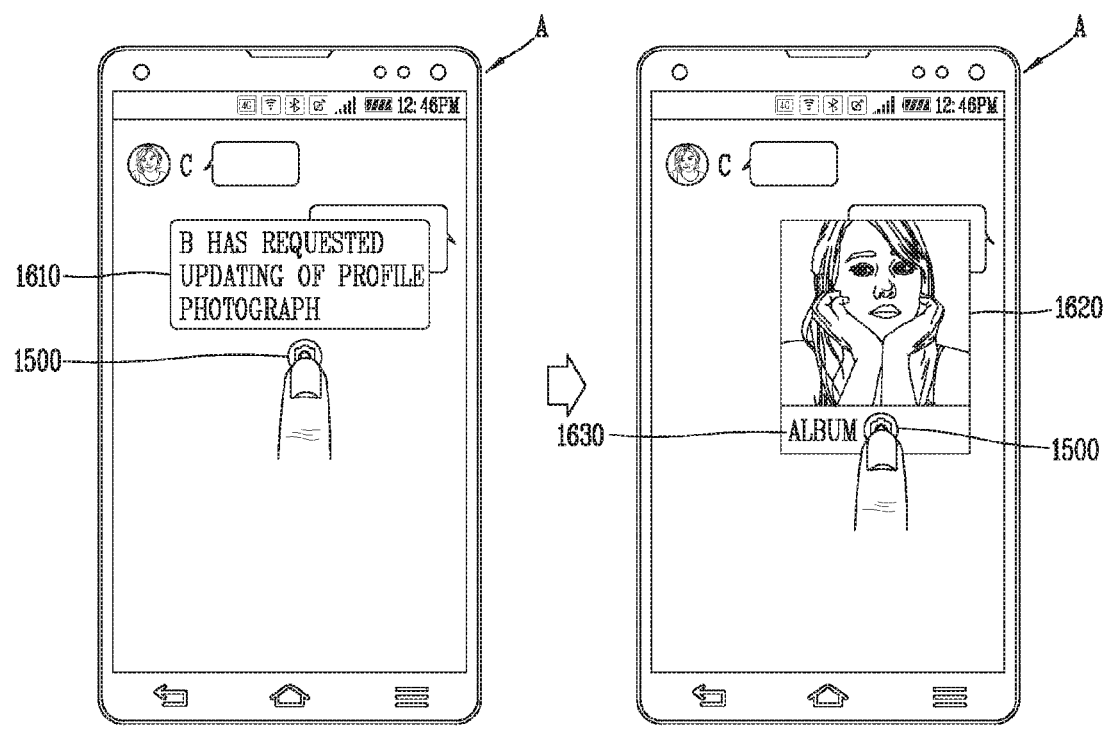
Figure 17:
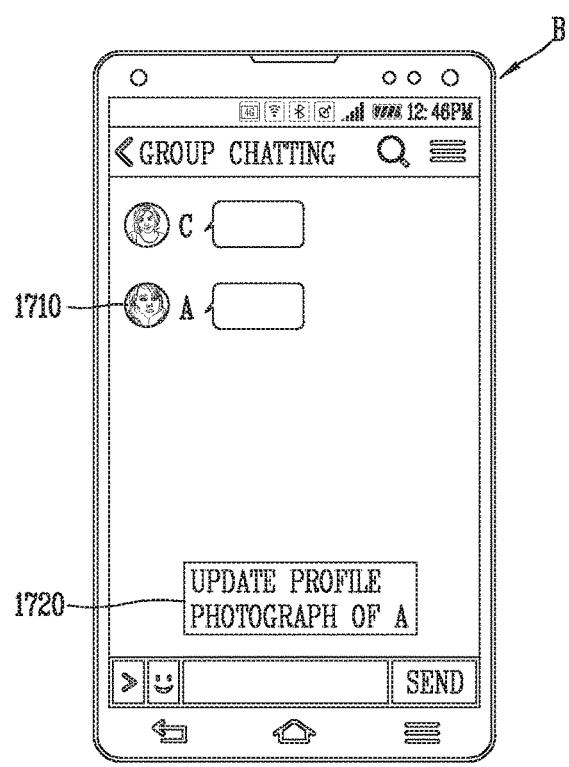

FIGS. 15 to 17 are conceptual diagrams for describing an embodiment where a photographing button is shared in a messenger dialog window.

FIGS. 15 and 17 illustrate a terminal of a user B sending a profile photograph update request message, and FIG. 16 illustrates a terminal of a user A receiving the request message.

Referring to FIG. 15, in the terminal of the user B, a photographing button 1500 separated from a camera application may be displayed on a messenger dialog window 1510.

In an embodiment, a drag input 1520 may be applied to the separated photographing button 1500 as a profile photograph of the user A which is one of third dialog parties. Therefore, the photographing button 1500 in a floating state may move to a profile photograph position of the user A.

Subsequently, when a double tap input 1530 is applied to the photographing button 1500, a message window 1540 for asking whether to request updating of a profile photograph may be displayed. When a touch input is applied to the message window 1540, a message for asking updating of the profile photograph may be sent to the terminal of the user A.

Referring to FIG. 16, in an embodiment succeeding FIG. 15, the terminal of the user A may display the photographing button 1500 having a floating state and a message window 1610 for informing that the user B has requested updating of a profile photograph.

Therefore, when a touch input is applied to the photographing button 1500, an execution window 1620 for a camera application may be displayed. In an embodiment, a front camera 121*a* for photographing a profile photograph may be activated, and the profile photograph may be photographed by applying a touch input to the photographing button 1500.

In an another embodiment, by applying a touch input to an album menu 1630, a photograph which is to be set as a profile photograph may be selected from a photograph album.

In this manner, when a photograph is photographed or is selected from a photograph album, the profile photograph of the user A may be immediately updated in a messenger. Alternatively, the profile photograph may be updated in only a corresponding dialog window.

Referring to FIG. 17, in an embodiment succeeding FIG. 16, the terminal of the user B or a terminal of a third party in a dialog window may display (1710) the profile photograph of the user A which is updated. In an embodiment, a message window 1720 for informing that the profile photograph of the user A has been updated may be displayed.

In another embodiment, a representative photograph of the user A stored in an address list application may be changed to the updated profile photograph of the user A.

Figure 18:
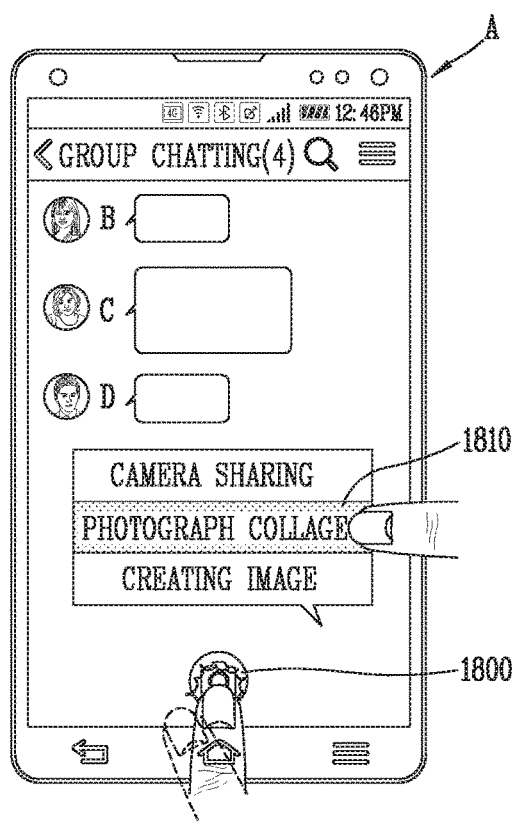
FIGS. 18 to 20 are conceptual diagrams for describing an embodiment where a photographing button is shared and content to be shared is generated.
Figure 19:
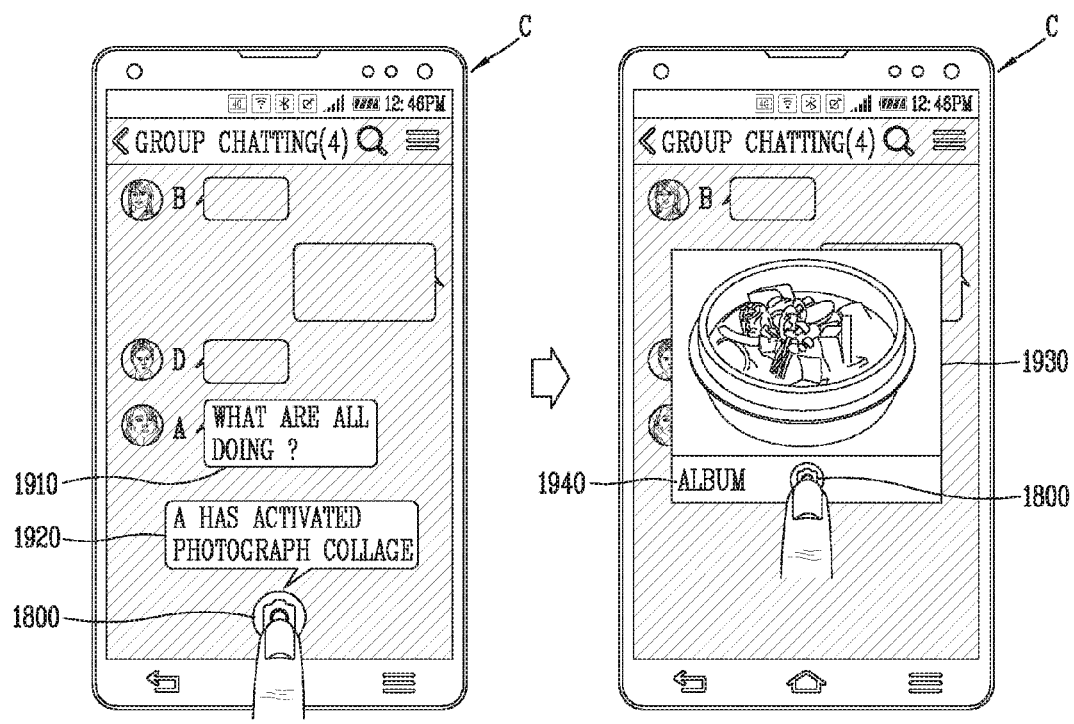
Figure 20:
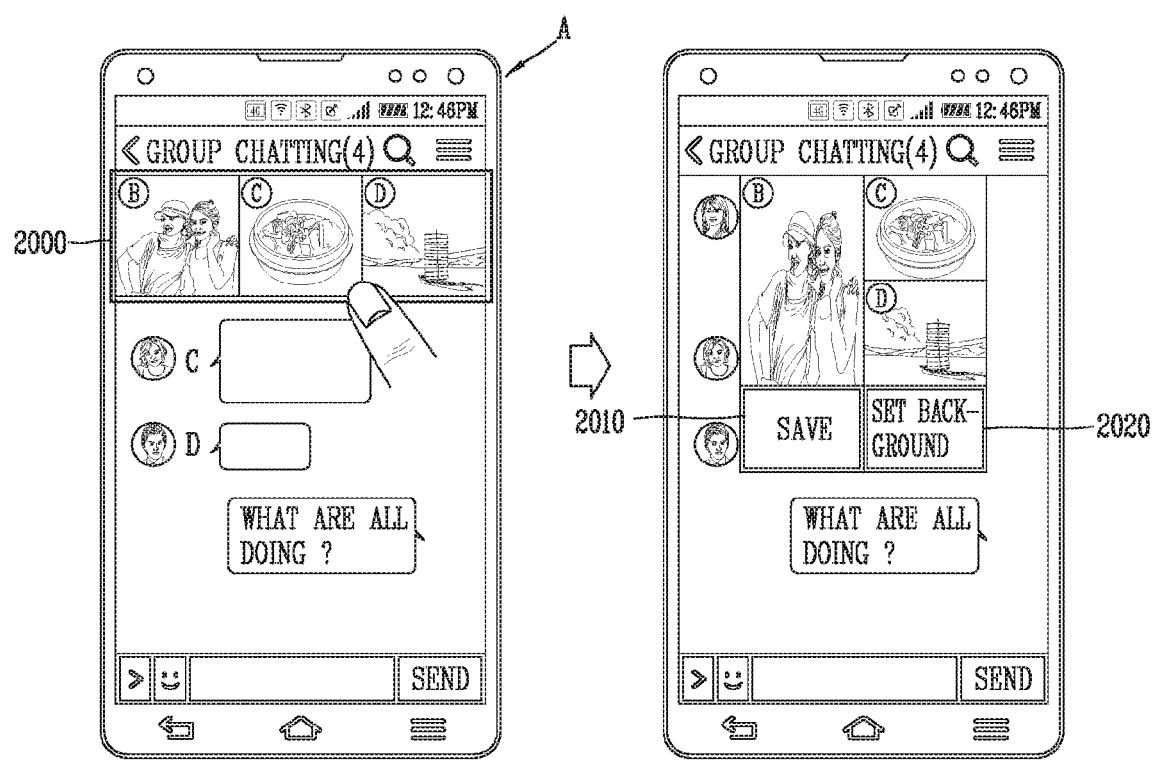

FIGS. 18 to 20 are conceptual diagrams for describing an embodiment where a photographing button is shared and content to be shared is generated.

Referring to FIG. 18, in a terminal of a user A, a photographing button 1800 separated from a camera application may be displayed on a messenger dialog window. In an embodiment, when a double tap input is applied to the photographing button 1800 located at a lower center of the messenger dialog window, a camera sharing menu, a photograph collage menu 1810, and an image creation menu may be displayed.

In an embodiment, when a touch input is applied to the camera sharing menu, the image creation menu, or the photograph collage menu 1810, a photographing button may be displayed by terminals of third dialog parties.

Referring to FIG. 19, in an embodiment succeeding FIG. 18, when a touch input is applied to the photograph collage menu 1810, a terminal of a third dialog party C may display a message 1910 sent from the user A and a message 1920 for informing that the user A has activated a photograph collage.

Subsequently, when a touch input is applied to the photographing button 1800, a camera may be activated, and an execution screen 1930 for the camera application may be displayed. In an embodiment, a photograph may be photographed by applying a touch input to the photographing button 1800.

In another embodiment, by applying a touch input to an album menu 1940, a photograph which is to be set as a collage album may be selected from a photograph album.

Moreover, in such an embodiment, other third dialog parties B and D may send photographs.

Referring to FIG. 20, in an embodiment succeeding FIG. 19, photographs 2000 sent from terminals of third dialog parties B to D may be displayed on an upper portion of a chatting room (a dialog room or a dialog window).

In an embodiment, the sent photographs 2000 may be displayed on the dialog room, but editing of the sent photographs 2000 may be performed by only the terminal of the user A which has sent the sharing button.

In detail, the photographs 2000 may be displayed on dialog windows of the terminal B to D, but only the terminal of the user A may perform editing such as the deletion, arrangement order change, image effect application, etc. of the photographs 2000.

In another embodiment, when a touch input is applied to the collected photographs 2000, the photographs 2000 may be unfolded and displayed, and a storage icon 2010 and a background setting icon 2020 may be displayed.

In detail, the collected photographs 2000 may be folded till an update time and then may be unfolded, and by applying a touch input to the storage icon 2010, the photographs 2000 may be stored.

In another embodiment, when a touch input is applied to the background setting icon 2020, collected photographs (collage) may be automatically set as a background of a dialog room whenever the photographs are collected.

Likewise, in FIG. 18, when the image creation menu is selected, images sent from terminals of third dialog parties may be displayed on an upper portion of a dialog window. In another embodiment, one image obtained by combining sent photographs may be displayed.

Figure 21:
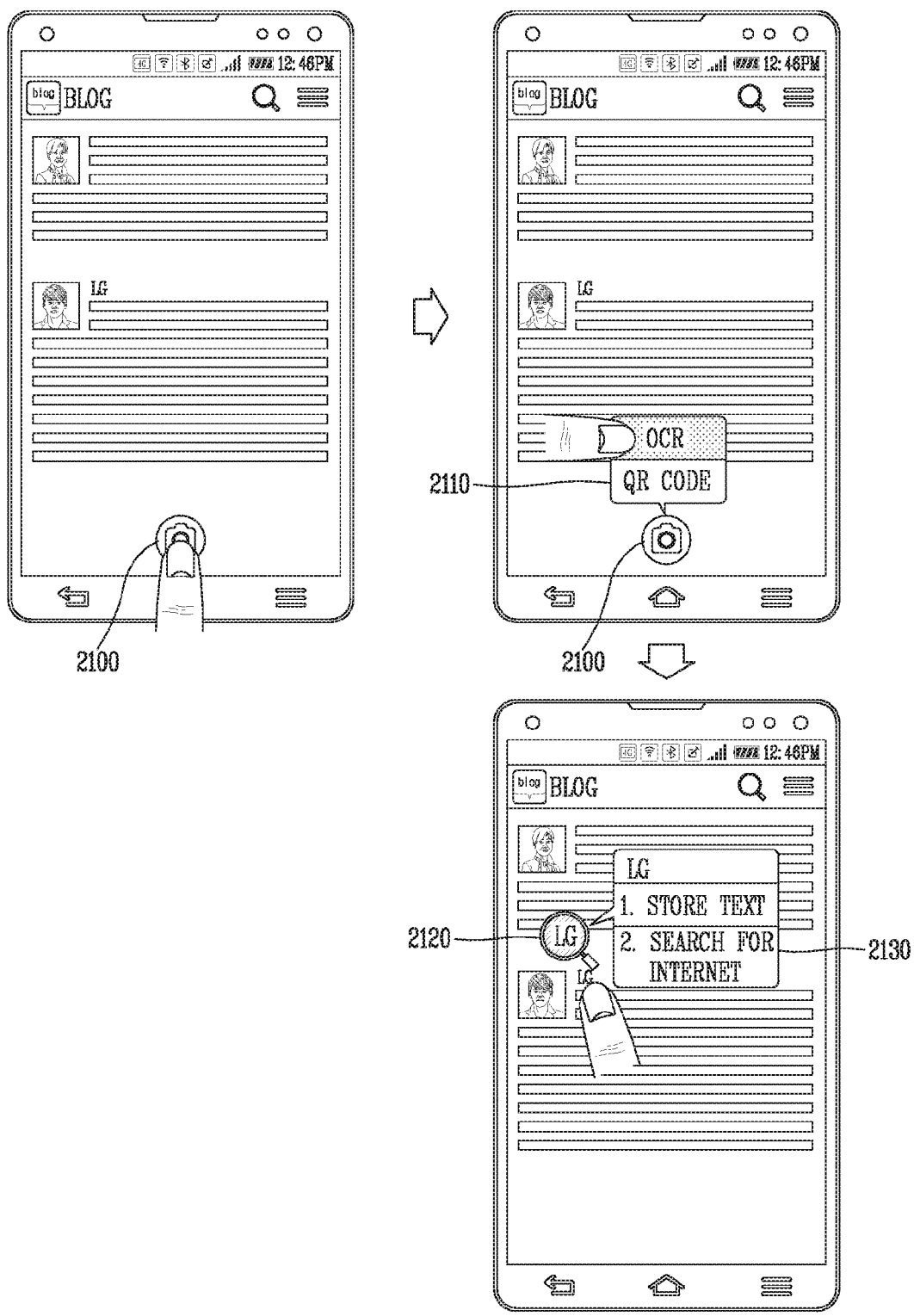
FIG. 21 is a conceptual diagram for describing an embodiment where an OCR or QR code function is executed by using a separated photographing button.

FIG. 21 is a conceptual diagram for describing an embodiment where an OCR or QR code function is executed by using a separated photographing button.

Referring to FIG. 21, a photographing button 2100 separated from a camera application may be displayed on an execution screen for a browser application.

In an embodiment, when a touch input is applied to the photographing button 2100, the execution screen for the browser application may be captured, and a menu 2110 for executing an OCR or QR code function may be displayed.

Subsequently, when the OCR menu is selected, a preview 2120 having a magnifying glass shape may be displayed, a text in the preview 2120 may be highlighted, whereby a real-time translation function may be executed. That is, an image of a region which is recognized as OCR and highlighted may be textualized, and the textualized image may be translated and displayed in real time.

In another embodiment, when a drag input is applied, the magnifying glass shape may move, and a preview region may be changed.

In another embodiment, when an QR code menu is selected, a function of analyzing a selected part may be executed.

In another embodiment, a menu 2130 for executing a text storing function or an Internet search function may be displayed along with the preview 2120 having a magnifying glass shape. When the text storing menu is selected, an image in a preview may be textualized and stored as PDF or the like. In another embodiment, when the Internet search menu is selected, a result obtained by searching for texts on the Internet may be displayed.

Figure 22:
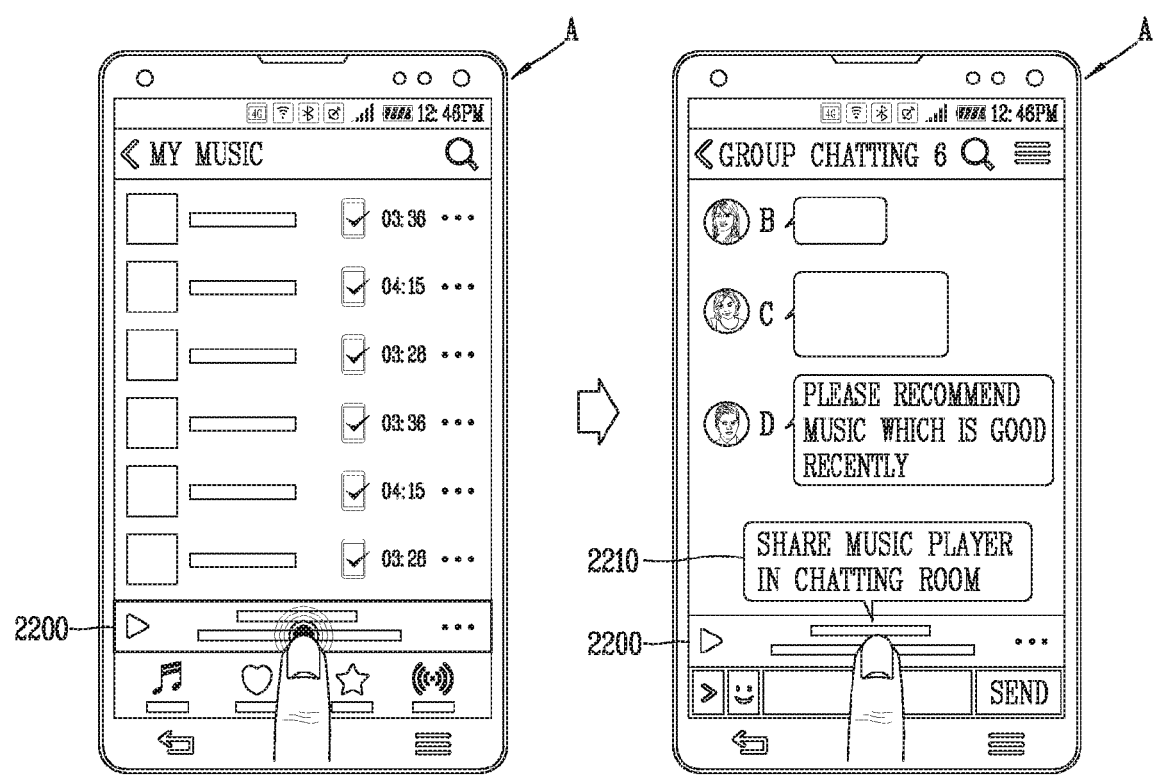
FIGS. 22 and 23 are conceptual diagrams for describing an embodiment where a music reproduction controller is shared in a dialog window.
Figure 23:
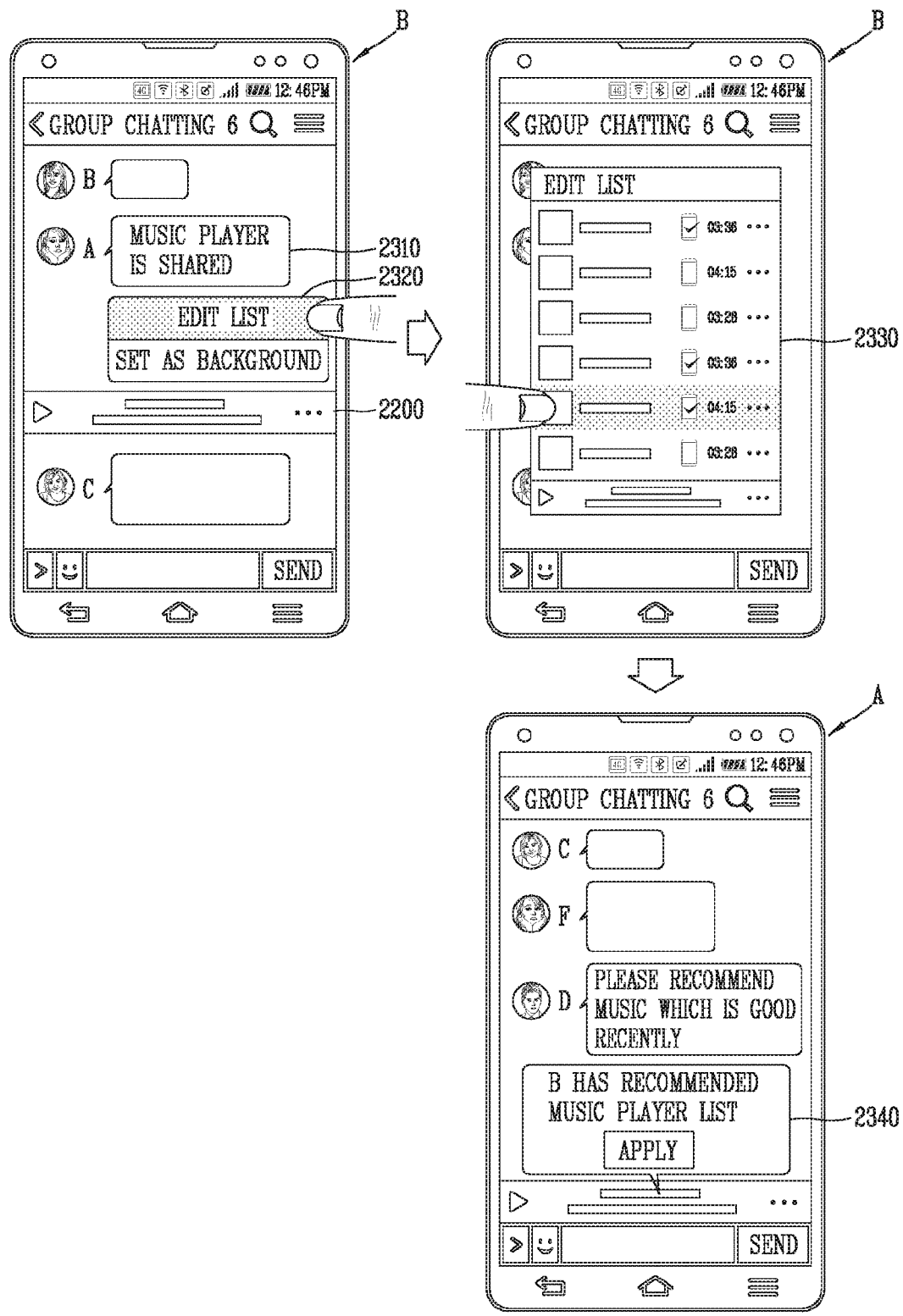

FIGS. 22 and 23 are conceptual diagrams for describing an embodiment where a music reproduction controller is shared in a dialog window.

Referring to FIG. 22, when a touch input is applied to a music controller 2200 which is being displayed on an execution screen for a music reproduction application in a terminal of a user A, the music controller 2200 may be changed to a floating state.

In an embodiment, when a double tap input is applied to the music controller 2200 which is being displayed on a dialog window, terminals of third dialog parties may display the music controller 2200. At this time, a message 2210 for informing that the music controller 2200 is shared may be displayed on a chatting room.

In an embodiment succeeding FIG. 22, namely, an embodiment where a terminal of a third dialog party B is displayed, referring to FIG. 23, a music controller 2200 and a message 2310 for informing that the user A shares a music controller (a music player) may be displayed on a dialog window.

Subsequently, a menu 2320 for editing a music list or setting a background music may be displayed. In an embodiment, when a touch input is applied to a menu for setting the background music, sharers may reproduce a shared music list and may listen to a reproduced music.

In another embodiment, when a touch input is applied to a list editing menu, a screen 2330 for editing a music list of a sharer may be displayed. Therefore, editing may be performed by deleting items of the music list, changing an order, or selecting a reproduction list.

As a result, the edited list may be sent to the terminal of the user A. In an embodiment, a message 2340 informing that the user B has edited the music list and asking whether to apply the edited music list may be displayed by the terminal of the user A.

That is, according to the embodiment of FIGS. 22 and 23, the reproduction button and the music list may be shared and may be set as a background music of the chatting room, or the music list may be edited and recommended.

Figure 24:
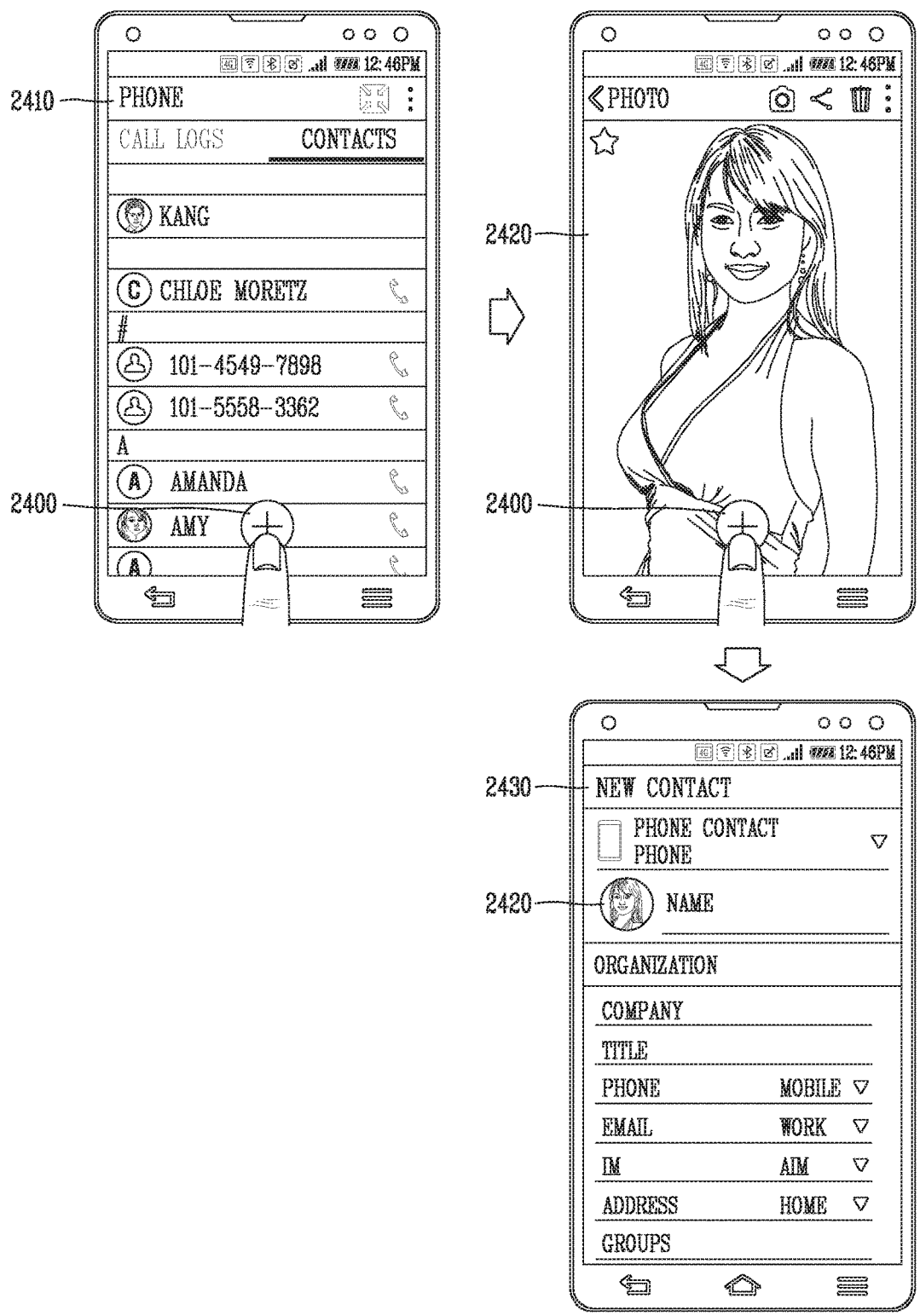
FIG. 24 is a conceptual diagram for describing an embodiment where an address is added by using an address list addition button in a photograph album application.

FIG. 24 is a conceptual diagram for describing an embodiment where an address is added by using an address list addition button in a photograph album application.

Referring to FIG. 24, when a force touch input is applied to an adding button 2400 in an execution screen 2410 for an address list application, the adding button 2400 may be separated from the execution screen 2410 and may be displayed on an execution screen for a photograph album application.

In an embodiment, when a touch input is applied to the adding button 2400, a screen 2430 for adding a new address having a state where a photograph image 2420 which is being displayed on a photograph album is set as a photograph identification (ID) may be displayed.

Figure 25:
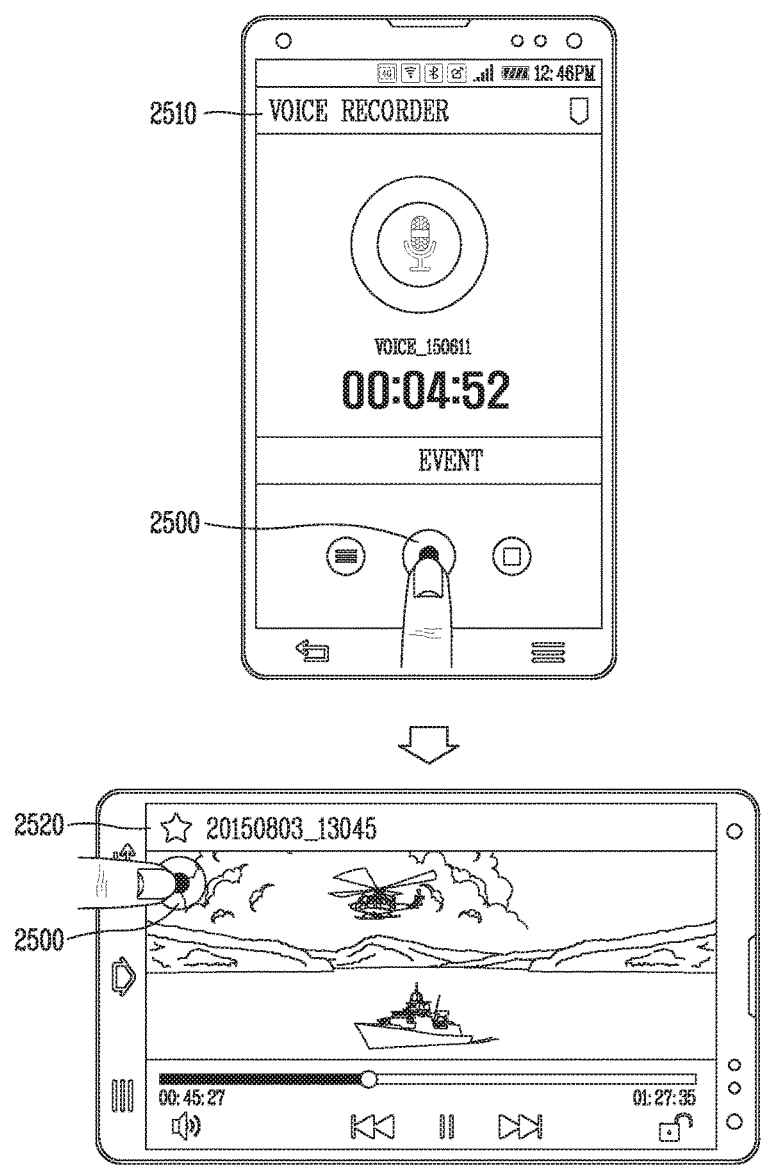
FIG. 25 is a conceptual diagram for describing an embodiment where a separated record button is used when reproducing video.

FIG. 25 is a conceptual diagram for describing an embodiment where a separated record button is used when reproducing video.

Referring to FIG. 25, when a force touch input is applied to a record button 2500 in an execution screen 2510 for a voice record application, the record button 2500 may be separated from the execution screen 2510 and may be displayed on a video reproduction screen 2520.

In an embodiment, when a touch input is applied to the record button 2500, only a sound of video which is being reproduced may be recorded.

Based on a predetermined user input being applied to a first object which is being displayed in a floating state on an execution screen for a second application and a second object for executing a second control operation in the second application, the control unit 180 may execute a control operation associated with the first control operation and the second control operation in the second application.

In an embodiment, based on the predetermined user input being applied to the first object and the second object, the control unit 180 may output a new synthesis object having the floating state corresponding to the first object and the second object.

In another embodiment, based on the predetermined user input being applied to the synthesis object, the control unit 180 may execute the associated control operation in the second application.

Figure 26:
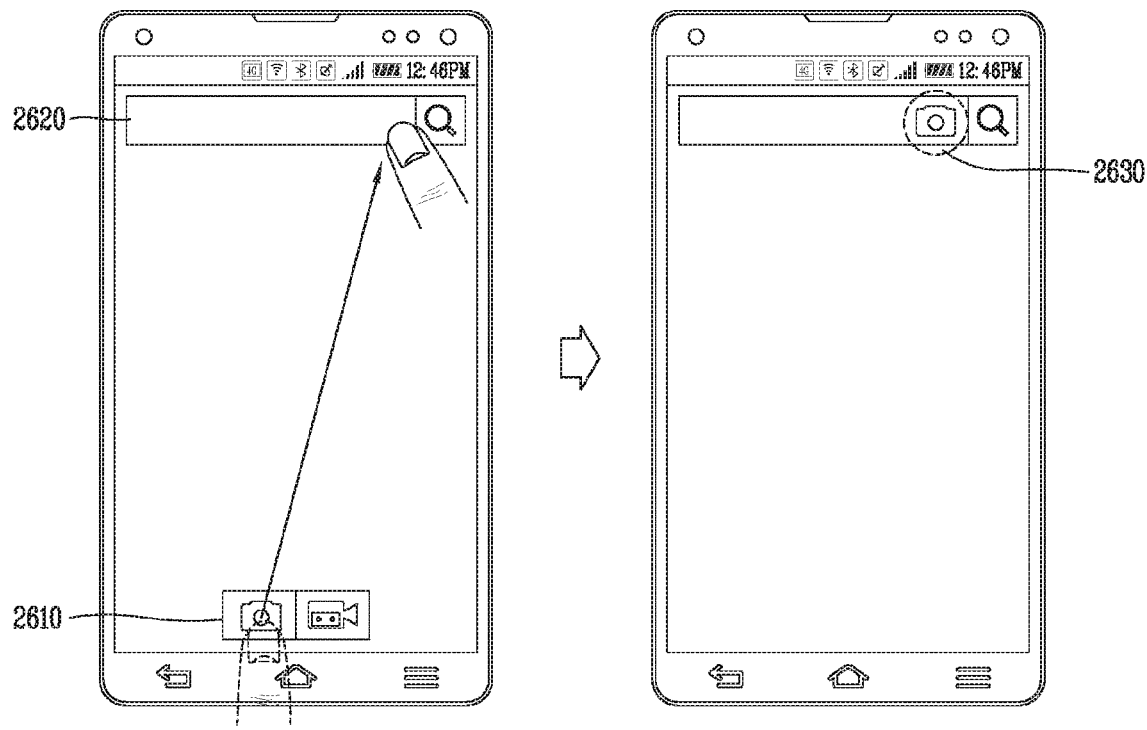
FIG. 26 is a conceptual diagram for describing an embodiment where associated functions are executed by a synthesis control button obtained by synthesizing a plurality of control buttons.

FIG. 26 is a conceptual diagram for describing an embodiment where associated functions are executed by a synthesis control button obtained by synthesizing a plurality of control buttons.

Referring to FIG. 26, when a drag input for dragging to a search window 2620 is applied to a photographing button 2610 separated from an execution screen for a camera application, a new synthesis icon 2630 may be displayed.

In an embodiment, when a touch input is applied to the synthesis icon 2630, a function of searching for a capture image may be executed. That is, a floating button separated from a first application may be synthesize with a second application, and thus, a cooperated function may be provided.

Based on a predetermined user input being applied to the synthesis object, the control unit 180 may execute a control operation corresponding to the relevant control operation in a third application which is executed after the second application ends.

Figure 27:
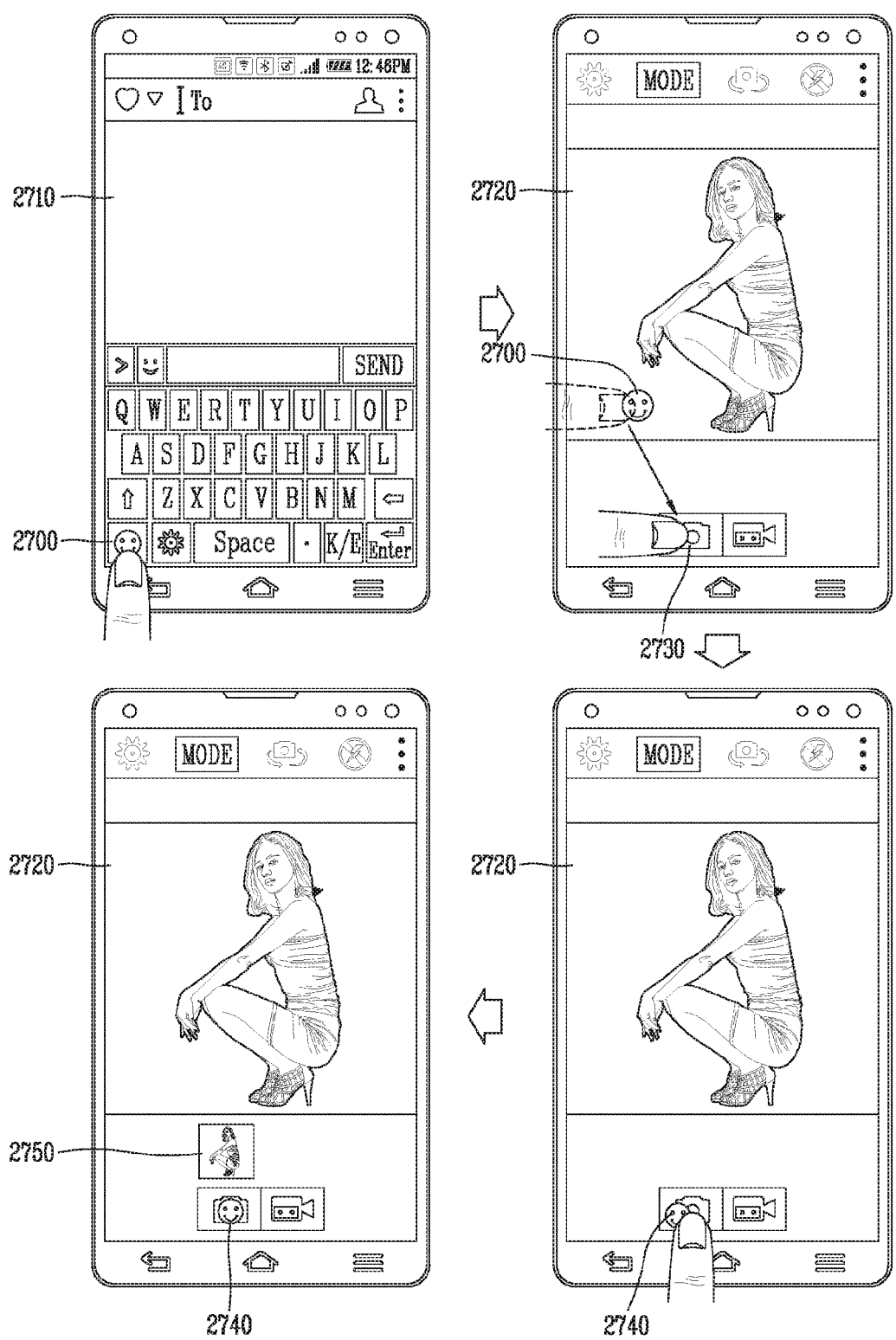
FIGS. 27 and 28 are conceptual diagrams for describing an embodiment where an emoticon is generated by synthesizing a separated emoticon button and photographing button.
Figure 28:
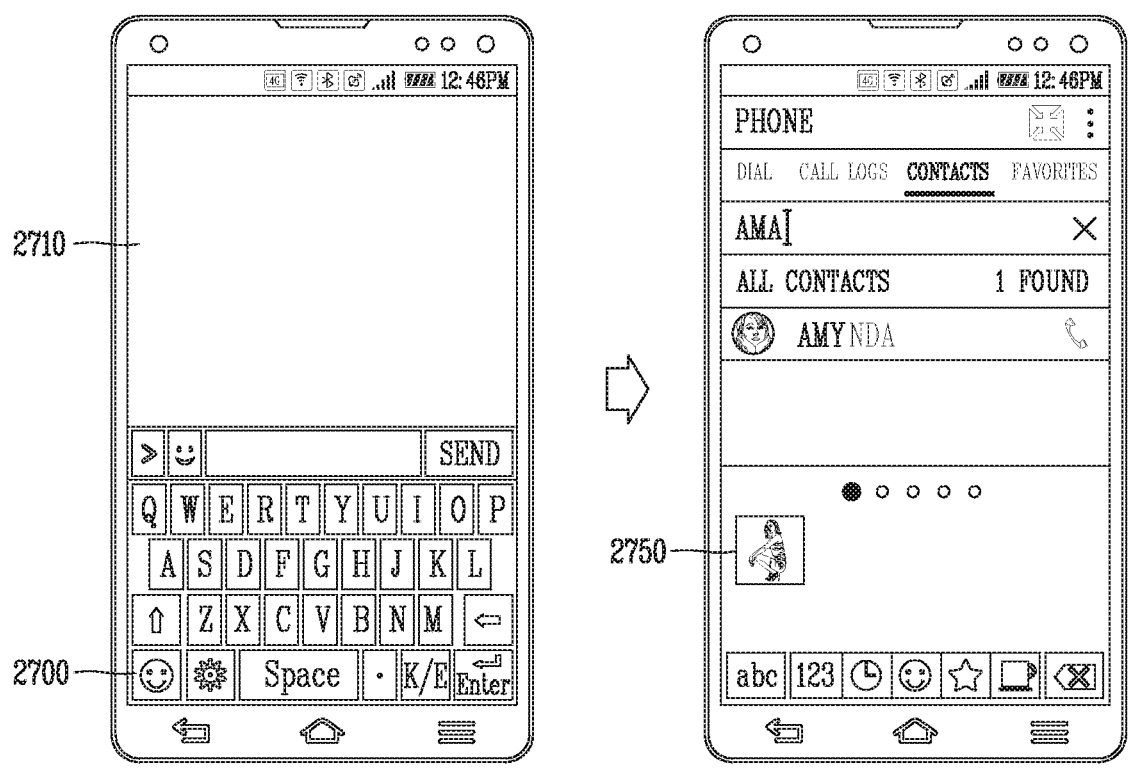

FIGS. 27 and 28 are conceptual diagrams for describing an embodiment where an emoticon is generated by synthesizing a separated emoticon button and photographing button.

Referring to FIG. 27, when a force touch input is applied to an emoticon button 2700 of a keyboard in a message writing screen 2710, the emoticon button 2700 may be separated and may be displayed on an execution screen for a camera application.

In an embodiment, when a drag input for dragging to a photographing button 2730 is applied to the emoticon button 2700, a button 2740 obtained by synthesizing the emoticon button 2700 and the photographing button 2730 may be generated. For example, an emoticon may be displayed on the photographing button 2730 to overlap the photographing button 2730.

In another embodiment, when a force touch input is applied to the photographing button 2730 while the emoticon button 2700 is being displayed, the button 2740 obtained by synthesizing the emoticon button 2700 and the photographing button 2730 may be generated.

When a touch input is applied to the generated synthesis button 2740, a preview image 2720 may be captured, and a thumbnail image of the preview image 2720 or an emoticon 2750 corresponding thereto may be displayed near the synthesis button 2740.

In another embodiment, when a long push input is applied to the synthesis button 2740, burst shoot photographing may be performed, and thus, an emoticon to which an animation is applied based on a GIF type may be generated.

In an embodiment succeeding FIG. 27, referring to FIG. 28, when the emoticon button 2700 is again pressed in the message writing screen 2710, the emoticon 2750 of the generated preview image may be displayed. That is, the captured preview image may be used as an emoticon when writing a text.

In another embodiment, an emoticon button of a keyboard may be separated in a floating state and may be used as an instant emoticon creation tool.

Figure 29:
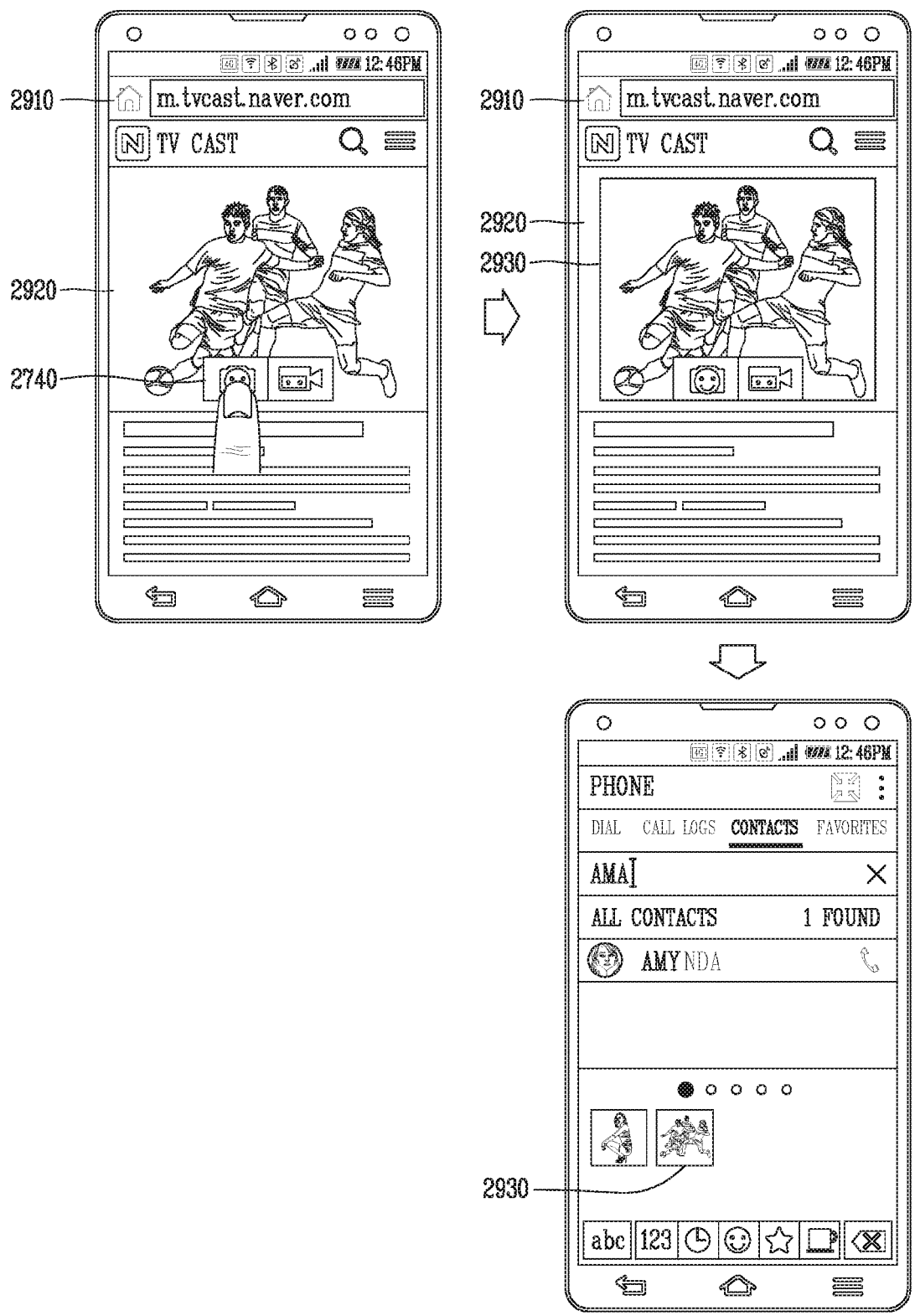
FIG. 29 is a conceptual diagram for describing an embodiment where a separated emoticon button and photographing button are synthesized and used as an emoticon creation tool.

FIG. 29 is a conceptual diagram for describing an embodiment where a separated emoticon button and photographing button are synthesized and used as an emoticon creation tool.

Referring to FIG. 29, a synthesis button 2740 (an emoticapture button) obtained by synthesizing the generated emoticon button and photographing button may be displayed on a webpage screen 2910.

In an embodiment, the synthesis button 2740 may be located on a picture or an image 2920 of the webpage screen 2910, and when a touch input is applied to the synthesis button 2740, the picture or the image 2920 may be captured and may be generated as an emoticon 2930.

In another embodiment, the synthesis button 2740 may be located on the picture or the image 2920 of the webpage screen 2910, and when a long push input is applied to the synthesis button 2740, the picture or the image 2920 may be captured as burst shoot, and thus, the emoticon 2930 to which an animation is applied based on a GIF type may be generated.

As a result, the generated emoticon 2930 may be displayed on a text writing screen.

FIG. 30 is a conceptual diagram for describing an embodiment where an image is searched for in a browser application, based on a synthesis button obtained by synthesizing a separated photographing button and a selection image.

Referring to FIG. 30, a photographing button 3000 may be separated by applying a force touch input to the photographing button 3000 of a camera application, and then, may be selected through block designation by applying a touch input to a photograph 3010 of a photograph album application. Subsequently, when a touch input is applied to the photographing button 3000, the photograph 3010 selected through the block designation may be captured.

In another embodiment, the photographing button 3000 may be located on the photograph 3010, and when the photograph button 3000 is touched, the photograph 3010 may be captured.

Therefore, a synthesis button 3020 obtained by synthesizing the captured photograph 3010 and the photographing button 3000 may be generated. For example, the synthesis button 3020 may be generated in a state where a camera icon 3000 overlaps the captured photograph 3010.

In another embodiment, when a drag input 3030 for dragging to a browser application search window is applied to the synthesis button 3020, a new synthesis button 3050 obtained by synthesizing the synthesis button 3020 and a search icon 3040 of a search window may be generated.

For example, the new synthesis button 3050 may have a shape where a camera shape overlaps a magnifying glass shape. When a touch input is applied to the new synthesis button 3050, a result obtained by searching for the selected capture photograph 3010 in the Internet browser may be displayed.

Figure 31:
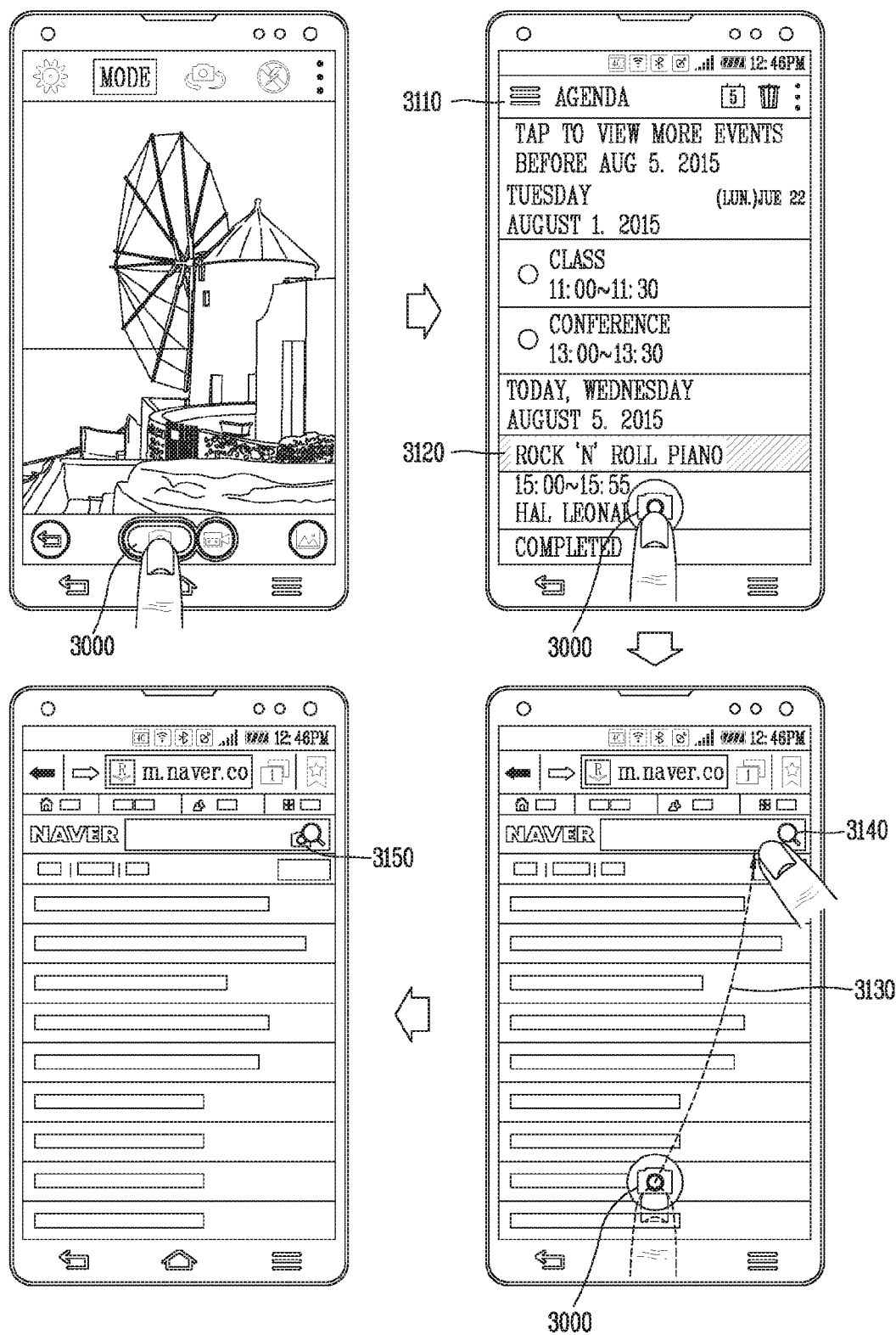
FIG. 31 is a conceptual diagram for describing an embodiment where a text is searched for in a browser application, based on a synthesis button obtained by synthesizing a separated photographing button and a selection text.

FIG. 31 is a conceptual diagram for describing an embodiment where a text is searched for in a browser application, based on a synthesis button obtained by synthesizing a separated photographing button and a selection text.

Referring to FIG. 31, when a photographing button 3000 is separated by applying a force touch input to the photographing button 3000 of a camera application, the photographing button 3000 may be displayed on an execution screen 3110 for a scheduling application.

Subsequently, a schedule 3120 may be selected through block designation by applying a touch input, and when a touch input is applied to the photographing button 3000, the schedule 3120 selected through the block designation may be captured.

Subsequently, when a drag input 3130 for dragging to a browser application search window is applied to the photographing button 3000, a synthesis button 3150 obtained by synthesizing the photographing button 3000 and a search icon 3140 of a search window may be generated.

For example, the synthesis button 3150 may have a shape where a camera shape overlaps a magnifying glass shape. When a touch input is applied to the synthesis button 3150, a result obtained by searching for the captured schedule 3120 in the Internet browser may be displayed.

According to the embodiment of FIG. 31, if a text is not copied, the above-described function may be used as a useful function.

Figure 32:
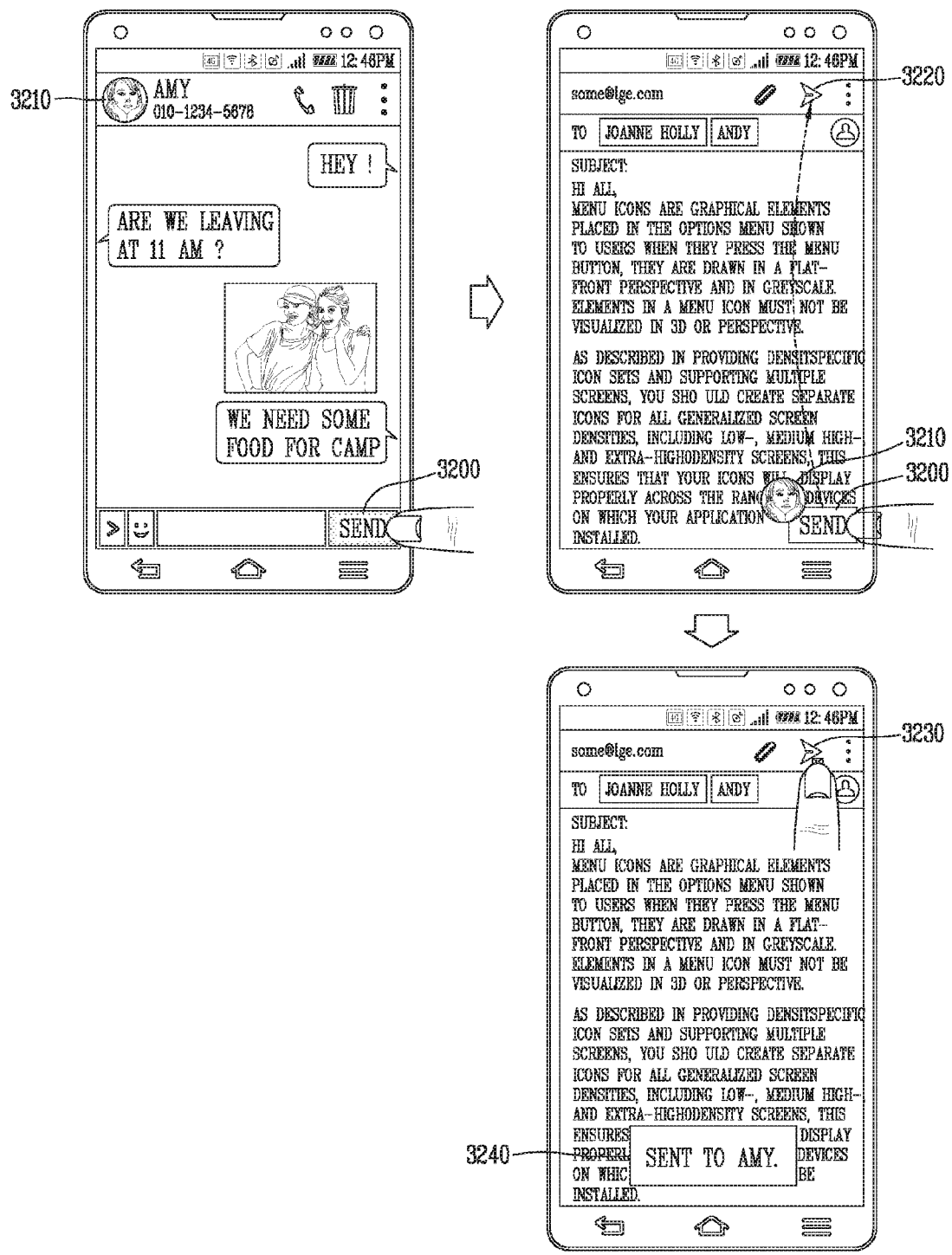
FIG. 32 is a conceptual diagram for describing an embodiment where a button is generated by synthesizing a messenger send button and an email send button.

FIG. 32 is a conceptual diagram for describing an embodiment where a button is generated by synthesizing a messenger send button and an email send button.

Referring to FIG. 32, when a force touch input is applied to a send button 3200 of a messenger application, the send button 3200 may be separated.

In an embodiment, a profile photograph 3210 of a messenger third dialog party may be displayed on the send button 3200 separated in a floating state.

In another embodiment, an input for dragging to a send button 3220 of an email application may be applied to the separated send button 3200.

Therefore, a button 3230 may be generated by synthesizing the send button 3200 of the messenger application with the send button 3220 of the email application. For example, the synthesis button 3230 may be displayed in a state where a mail send icon overlaps a letter-shaped icon.

In a succeeding embodiment, when a touch input is applied to the synthesis button 3230, content written in the email application may be sent to an email receiver and a messenger third dialog party.

In detail, when a touch input is applied to the synthesis button 3230, a mail may be sent to a mail receiver, and simultaneously, mail content may be sent to a third party of a messenger dialog room through a message. Also, a popup window 3240 informing that a message has been sent to the messenger third dialog party may be displayed.

Hereinafter, an additional embodiment will be described.

A specific schedule (important content) may be selected (cropped) from an execution screen for a schedule (calendar) application, and then, a drag input for dragging to an upper display line of the display unit 151 which is displaying a current time may be applied.

Therefore, it may be set that an alarm is sounded before a certain time (for example, two hours) from a corresponding schedule time. In this manner, when an alarm is set, the set alarm may be temporarily displayed on an upper portion of the display unit 151.

Subsequently, when an alarm time arrives, sound or vibration notification may be output, and a corresponding schedule may be displayed on a lock screen.

In another embodiment, when a specific soundwave range is selected in reproducing a voice record file, only voices corresponding to the selected soundwave may be collected and extracted.

In detail, when a fingerprint is input to a fingerprint sensor and a desired soundwave range is selected (cropped), only a selected voice may be extracted and separately stored. At this time, texts (subtitles) of voice content may be stored together, and when reproducing the voice content, the texts may be output together.

Effects of the mobile terminal and the method of controlling the same according to the present invention will be described below.

According to at least one of the embodiments of the present invention, a control button of an application may be changed to a floating button, and thus, an output position may be freely set.

Moreover, according to at least one of the embodiments of the present invention, by providing the floating button to another application, functions of performing cooperation between applications may be quickly executed.

According to at least one of the embodiments of the present invention, a synthesis button may be generated by synthesizing a plurality of floating buttons, and thus, functions associated with two control operations may be simultaneously performed.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display; and
a controller configured to:
cause the display to display a first object in an execution screen for a first application;
change a state of the first object to a floating state in response to receiving a user input with regard to the first object, wherein the change of state permits the first object to be separated from the execution screen for the first application, and wherein the first object is associated with a first control operation for the first application;
cause the display to terminate the displaying of the execution screen of the first application;
cause the display to display the first object on an execution screen of a second application which is executed after the terminating of the displaying of the execution screen for the first application, wherein the second application is associated with a content item;
cause the display to display the content item on the execution screen of the second application; and
execute a second control operation for the content item associated with the second application in response to an input received with regard to the first object displayed on the execution screen of the second application, wherein the second control operation is associated with the first control operation.

2. The mobile terminal of claim 1, wherein the controller is further configured to:
cause the display to terminate the displaying of the first object on the execution screen of the second application in response to an input received with regard to the first object.

3. The mobile terminal of claim 1, wherein the controller is further configured to:
change a displayed location of the first object in the floating state on the execution screen of the first application in response to an input received with regard to the first object.

4. The mobile terminal of claim 1, wherein the controller is further configured to:
cause the display to display a second object on the execution screen of the second application;
change a state of the second object to the floating state in response to receiving a user input with regard to the second object;
cause the display to terminate the displaying of the execution screen of the second application; and
cause the display to display the first object and the second object on an execution screen of a third application which is executed after the terminating of the displaying of the execution screen for the second application.

5. The mobile terminal of claim 4, wherein the controller is further configured to:
cause the display to display on the execution screen of the third application, information associated with the first application on the first object, and display information associated with the second application on the second object.

6. The mobile terminal of claim 1, wherein the first application includes a message application and the first object includes a send icon for sending the content item according to the second control operation.

7. The mobile terminal of claim 1, wherein the first application includes a browser application and the first object includes a search window.

8. The mobile terminal of claim 7, wherein the controller is further configured to:
cause the display to display, on the execution screen of the second application, a result of a search for an input received with regard to the search window displayed on the execution screen of the second application.

9. The mobile terminal of claim 1, wherein the first application includes a calculator application and the first object includes a calculation icon; and
wherein the controller is further configured to:
cause the display to display, on the execution screen of the second application, a calculation result of an input received with regard to the calculation icon displayed on the execution screen of the second application.

10. The mobile terminal of claim 1, wherein the first application includes a camera application and the first object includes a photographing icon.

11. The mobile terminal of claim 10, further comprising:
a memory;
wherein the controller is further configured to:
capture and store in the memory the execution screen of the second application in response to an input received with regard to the photographing icon displayed on the execution screen of the second application.

12. The mobile terminal of claim 10, further comprising:
a memory;
wherein the controller is further configured to:
cause the display to display content on the execution screen of the second application; and
capture and store in the memory the displayed content in response to an input received with regard to the photographing icon displayed on the execution screen of the second application.

13. The mobile terminal of claim 10, wherein the controller is further configured to:
cause the display to display, on the execution screen of the second application, a dialog window of the second application, wherein the second application is a message send application and the dialog window comprises an identifier of another terminal between which messages are exchanged; and
cause the display to display the photographing icon on the identifier of the another terminal in the dialog window in response to an input received with regard to the photographing icon.

14. The mobile terminal of claim 1, wherein the controller is further configured to:
cause the display to display a second object on the execution screen of the second application, wherein the second object is associated with a third control operation for the second application; and
execute the second control operation associated with the first control operation and execute the third control operation in response to an input received with regard to the first object displayed on the execution screen of the second application and the second object.

15. The mobile terminal of claim 14, wherein the controller is further configured to:
cause the display to display a third object having the floating state on the execution screen of the second application, wherein the third object is associated with the first control operation of the first object and the third control operation, wherein the displaying of the third object is in response to the input received with regard to the first object displayed on the execution screen of the second application and the second object.

16. The mobile terminal of claim 15, wherein the controller is further configured to:
execute the first control operation of the first object and the third control operation of the second application in response to an input to the third object.

17. The mobile terminal of claim 15, wherein the controller is further configured to:
execute a fourth control operation corresponding to the first control operation and the third control operation in a third application displayed after terminating of the displaying of the second application, wherein executing of the fourth control operation is in response to an input to the third object.

18. A method of controlling a mobile terminal having a display, the method comprising:
displaying, on the display, a first object in an execution screen for a first application;
changing a state of the first object to a floating state in response to receiving a user input with regard to the first object, wherein the change of state permits the first object to be separated from the execution screen for the first application, and wherein the first object is associated with a first control operation for the first application;
causing the display to terminate the displaying of the execution screen of the first application;
displaying, on the display, the first object on an execution screen of a second application which is executed after the terminating of the displaying of the execution screen for the first application, wherein the second application is associated with a content item;
displaying, on the display, the content item on the execution screen of the second application; and
executing a second control operation for the content item associated with the second application in response to an input received with regard to the first object displayed on the execution screen of the second application, wherein the second control operation is associated with the first control operation.

19. The method of claim 18, further comprising:
terminating the displaying of the first object on the execution screen of the second application in response to an input received with regard to the first object.

* * * * *